(12) United States Patent
Thoni et al.

(10) Patent No.: US 11,085,665 B2
(45) Date of Patent: Aug. 10, 2021

(54) REMOTE SENSOR FOR SMART THERMOSTAT

(71) Applicant: Johnson Controls Technology Company, Auburn Hills, MI (US)

(72) Inventors: Mark A. Thoni, Pewaukee, WI (US); Vineet B. Sinha, Brookfield, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/538,411

(22) Filed: Aug. 12, 2019

(65) Prior Publication Data

US 2020/0049365 A1 Feb. 13, 2020

Related U.S. Application Data

(60) Provisional application No. 62/717,466, filed on Aug. 10, 2018.

(51) Int. Cl.
| | |
|---|---|
| *G05B 99/00* | (2006.01) |
| *F24F 11/89* | (2018.01) |
| *F24F 11/56* | (2018.01) |
| *G05B 15/02* | (2006.01) |
| *F24F 110/66* | (2018.01) |
| *F24F 110/68* | (2018.01) |
| *F24F 110/70* | (2018.01) |
| *H05B 47/19* | (2020.01) |

(52) U.S. Cl.
CPC ............. *F24F 11/89* (2018.01); *F24F 11/56* (2018.01); *G05B 15/02* (2013.01); *F24F 2110/66* (2018.01); *F24F 2110/68* (2018.01); *F24F 2110/70* (2018.01); *H05B 47/19* (2020.01)

(58) Field of Classification Search
CPC .............................................. G05B 2219/2614
USPC ......................................................... 700/276
See application file for complete search history.

(56) References Cited

U.S. PATENT DOCUMENTS

| | | | |
|---|---|---|---|
| 9,890,971 | B2 | 2/2018 | Ribbich et al. |
| 9,964,328 | B2 | 5/2018 | Ribbich et al. |
| 9,971,453 | B2 | 5/2018 | Alberth, Jr. |
| 10,020,956 | B2 | 7/2018 | Alberth, Jr. |
| 10,162,327 | B2 | 12/2018 | Sinha et al. |
| 10,180,673 | B2 | 1/2019 | Sinha et al. |
| 10,187,471 | B2 | 1/2019 | Alberth, Jr. |
| 10,310,477 | B2 | 6/2019 | Sinha et al. |
| 10,345,781 | B2 | 7/2019 | Sinha et al. |

(Continued)

*Primary Examiner* — Suresh Suryawanshi
(74) *Attorney, Agent, or Firm* — Foley & Lardner LLP

(57) ABSTRACT

A building control system includes a sensor unit, a space controller, and a controlled device. The space controller is configured to operate one or more controlled devices to affect one or more environmental conditions of a first space of a building. The sensor unit is communicably coupled to the space controller and is configured to be disposed in the first space. The sensor unit includes one or more sensors. The sensor unit is configured to determine an environmental condition of the first space based on sensor data from the sensor and configured to provide at least some of the sensor data to the space controller. The controlled device is communicably coupled to the sensor unit and is operable to affect the environmental condition of the first space. The sensor unit is configured to control the controlled device independently from the space controller.

21 Claims, 23 Drawing Sheets

(56) References Cited

U.S. PATENT DOCUMENTS

| | | | |
|---|---|---|---|
| 2005/0054355 A1* | 3/2005 | Saitou | H04Q 9/04 |
| | | | 455/463 |
| 2016/0189505 A1* | 6/2016 | Boettcher | G08B 19/00 |
| | | | 340/541 |
| 2016/0327298 A1 | 11/2016 | Sinha et al. | |
| 2016/0327299 A1 | 11/2016 | Ribbich et al. | |
| 2016/0327301 A1 | 11/2016 | Ribbich et al. | |
| 2016/0327921 A1* | 11/2016 | Ribbich | F24F 11/30 |
| 2017/0123391 A1 | 5/2017 | Sinha et al. | |
| 2018/0195749 A1* | 7/2018 | Sinha | F24F 11/63 |

* cited by examiner

REMOTE SENSOR FOR SMART THERMOSTAT

CROSS-REFERENCE TO RELATED PATENT APPLICATIONS

This application claims the benefit of and priority to U.S. Provisional Patent Application No. 62/717,466, filed Aug. 10, 2018, the entirety of which is incorporated by reference herein.

BACKGROUND

The present disclosure relates generally to thermostats and more particularly to the control of a building or space's heating, ventilating, and air conditioning (HVAC) system through the use of sensors that are communicatively coupled to a multi-function thermostat.

A thermostat is, in general, a component of an HVAC control system (e.g., an air conditioner, a furnace, etc.). Traditional thermostats sense the temperature or other parameters (e.g., humidity) of a system and control components of the HVAC system in order to maintain a set point for the temperature or other parameter. Thermostats are manufactured in many ways, and use a variety of sensors to measure temperature and other desired parameters of a system.

The sensors for conventional thermostats are configured to transmit measured parameters via one-way communication with the thermostat. Each thermostat may additionally include a user interface, which typically includes a display for presenting information to a user.

SUMMARY

One implementation of the present disclosure relates to a building control system. The building control system includes a sensor unit, a space controller, and a controlled device. The space controller is configured to operate one or more controlled devices to affect one or more environmental conditions of a first space of a building. The sensor unit is communicably coupled to the space controller and is configured to be disposed in the first space. The sensor unit includes one or more sensors. The sensor unit is configured to determine an environmental condition of the first space based on sensor data from the sensor and configured to provide at least some of the sensor data to the space controller. The controlled device is communicably coupled to the sensor unit and is operable to affect the environmental condition of the first space. The sensor unit is configured to control the controlled device independently from the space controller.

In some embodiments, the sensor unit is one of a plurality of sensor units and the building control system further includes a user control device. The user control device may be configured to access a web portal from which the plurality of sensor units may be identified, mapped to the first space, and paired with the space controller and the controlled device. In some embodiments, the plurality of sensor units may be mapped to the first space at the same time.

In some embodiments, the condition is at least one of a temperature of the first space, a humidity of the first space, an air quality of the first space, or an amount of lighting within the first space.

In some embodiments, the sensor is an air quality sensor. In some embodiments, the sensor unit may be configured to control the controlled device based on a determination that air quality data from the air quality sensor is greater than or less than an air quality threshold. The air quality sensor may be one of a $CO_2$ sensor configured to measure an amount of $CO_2$ in the first space, a VOC sensor configured to measure an amount of VOC in the first space, or a Radon sensor configured to measure an amount of Radon within the first space.

In some embodiments, the controlled device is one of an air conditioning unit, a heater, a light, an automatic window blind, a fan, or a smart vent.

In some embodiments, the building further includes a second space that is located at least partially remotely from the first space. In some embodiments, the controlled device may be configured to selectively modify the environmental condition of the first space independently from an environmental condition of the second space. Alternatively, or in combination, the sensor unit may be configured to transmit at least one of the sensor data or the environmental condition to the space controller. In some embodiments, the space controller is configured to control the controlled device to modify the environmental condition of the first space independently from an environmental condition of the second space based on the sensor data or the environmental condition.

In some embodiments, the sensor unit is a first sensor unit of a plurality of sensor units. The building control system may further include a second sensor unit. The first sensor unit may be configured to control the controlled device based on at least one of sensor data from the second sensor unit or a condition from the second sensor unit.

Another implementation of the present disclosure relates to a sensor unit. The sensor unit includes a housing, a sensor, a communications interface, and a processing circuit. The sensor, the communication interface, and the processing circuit are coupled to the housing, which is disposed in a first space of a building. The sensor is configured to generate sensor data that is indicative of an environmental condition of the first space. The communication interface is configured to communicate with a space controller and a controlled device. The processing circuit is configured to receive the sensor data from the sensor, identify the environmental condition of the first space based on the sensor data, and transmit, via the communications interface, a control signal to the controlled device independently from the space controller based on the environmental condition.

In some embodiments, the communications interface is configured to communicate with a user control device. In such an embodiment, the processing circuit may be further configured to transmit identification information associated with the sensor unit to the user control device, receive identifying information associated with the space controller and the controlled device, and pair with the space controller and the controlled device such that the sensor unit is communicably coupled to the space controller and the controlled device.

Yet another implementation of the present disclosure is a method. The method includes receiving, by a sensor unit that is communicably coupled to a space controller and a controlled device, sensor data from a sensor onboard the sensor unit. The space controller is configured to operate one or more controlled devices to affect one or more environmental conditions of a first space of a building. The method additionally includes identifying, by the sensor unit, an environmental condition of a first space based on the sensor data. The method further includes transmitting, by a communications interface onboard the sensor unit, a control signal to at least one of the controlled devices independently from the space controller based on the environmental condition.

In some embodiments, the method further includes transmitting, by the communications interface, identification information associated with the sensor unit; receiving identifying information associated with the space controller and the at least one controlled device; and pairing with the space controller and the at least one controlled device such that the sensor unit is communicably coupled to the space controller and the at least one controlled device.

DETAILED DESCRIPTION

Overview

Figure 1:
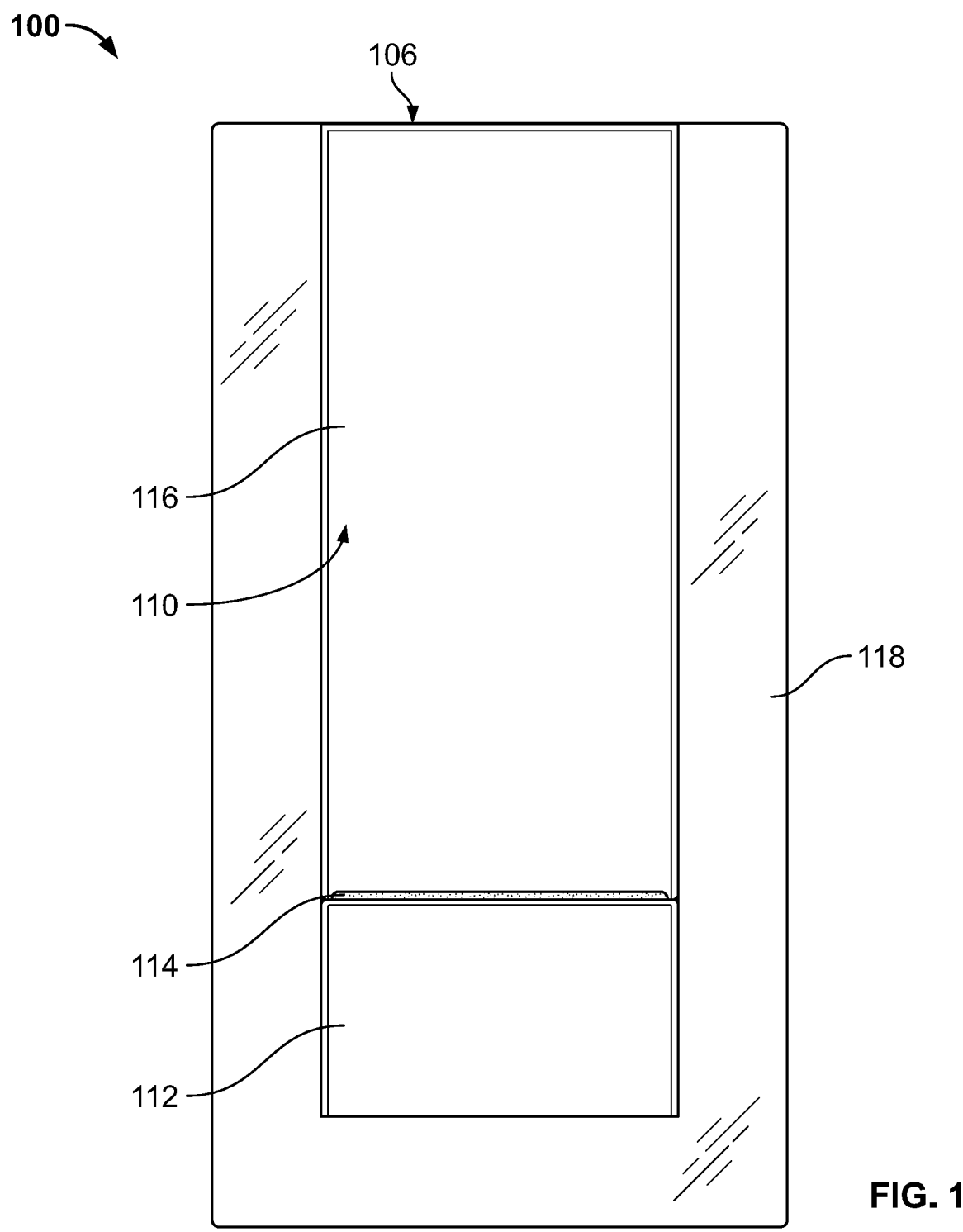
FIG. 1 is a front view of a remote sensor unit for a thermostat, according to an exemplary embodiment.

Referring generally to the FIGURES, a multi-function remote sensor unit for an HVAC control system is shown, according to various exemplary embodiments. The sensor unit is wirelessly coupled to a main control unit or thermostat and configured for bi-directional communication with the thermostat. The sensor unit is also wirelessly coupled to a controlled device and is configured to control the controlled device independently from the thermostat. Among other features, the position of the sensor unit within a building may be recognized by the thermostat or the controlled device. The sensor unit may be one of a plurality of sensor units, where each sensor is located at a different position within the building (e.g., a home, a classroom, a hotel, etc.). The sensor unit may be configured to cause the thermostat to control HVAC equipment based on applicable controls for the space where the sensor unit is located.

In some embodiments, the sensor unit is used in combination with a smart thermostat such as the thermostat described in U.S. patent application Ser. No. 15/143,373 filed Apr. 29, 2016, U.S. patent application Ser. No. 15/146,763 filed May 4, 2016, U.S. patent application Ser. No. 15/146,749 filed May 4, 2016, U.S. patent application Ser. No. 15/146,202 filed May 4, 2016, U.S. patent application Ser. No. 15/146,134 filed May 4, 2016, U.S. patent application Ser. No. 15/146,649 filed May 4, 2016, U.S. Provisional Patent Application No. 62/331,863 filed May 4, 2016, U.S. Provisional Patent Application No. 62/352,955 filed Jun. 21, 2016, U.S. patent application Ser. No. 15/298,191 filed Oct. 19, 2016, U.S. patent application Ser. No. 15/336,793 filed Oct. 28, 2016, U.S. patent application Ser. No. 15/336,792 filed Oct. 28, 2016, U.S. patent application Ser. No. 15/336,789 filed Oct. 28, 2016, U.S. patent application Ser. No. 15/338,221 filed Oct. 28, 2016, U.S. patent application Ser. No. 15/338,215 filed Oct. 28, 2016, U.S. patent application Ser. No. 15/336,791 filed Oct. 28, 2016, U.S.

patent application Ser. No. 15/397,722 filed Jan. 3, 2017, and/or U.S. Provisional Patent Application No. 62/446,296 filed Jan. 13, 2017. The entire disclosure of each of these patent applications is incorporated by reference herein.

The sensor unit may include one or a combination of onboard sensors including a temperature sensor, a humidity sensor, a light sensor, an occupancy sensor, and one or more air quality sensors (e.g., a carbon dioxide ($CO_2$) sensor, a volatile organic compound (VOC) sensor, carbon monoxide sensor, a radon detection sensor, etc.). The sensor unit may be configured to automatically adjust a value reported by an onboard sensor to the thermostat based on an amount of light or other parameter measured by an onboard sensor. The sensor unit may be configured to determine a condition of the space within which the sensor unit is located and control the controlled device based on the condition. The controlled device may be, for example, an air conditioning unit, a heater, a light, an automatic window blind, a fan, or a smart vent. The sensor unit may be configured to detect an occupancy condition of a room where the sensor unit is located and report the occupancy condition to the thermostat. The thermostat may be configured to control an HVAC component (a flow rate, an air conditioner, a furnace, etc.) based on the occupancy reading of the sensor unit. For example, the thermostat may be configured to divert cool/warm air to a room where the sensor unit is located to reduce the $CO_2$ content of the room, based on the occupancy reading of the sensor unit (e.g., an occupancy reading indicating that a person has entered the room).

The sensor unit may be reconfigurable between a wall mounted configuration and a standalone configuration (i.e., a table top configuration). The sensor unit may include a retractable stand configured support the sensor in the standalone configuration. The retractable stand may be rotatably coupled or slidably coupled to the sensor unit. The sensor unit may be battery operated and may include a communications card configured to provide wireless (e.g., Bluetooth, WiFi/radio, etc.) connectivity between the sensor unit and the thermostat.

The sensor unit may include one or a combination of indicators (e.g., one or more light emitting diodes (LEDs), etc.) configured to report a status of the sensor unit, the thermostat, the controlled device, and HVAC equipment and/or non-HVAC equipment to a user. For example, an LED indicator for the sensor unit may be configured to report a pairing status between the sensor unit and the thermostat (e.g., by blinking, generating a light of a certain color, etc.) to indicate whether the sensor unit is communicatively coupled to the thermostat. In some embodiments, the sensor unit may be configured to receive an operational status (e.g., of HVAC equipment, of other sensor units, etc.) and to report the operational status. For example, the sensor unit may indicate a cooling event in which the space is being cooled to a user by emitting a blue light, whereas a heating event in which the space is being heated may trigger a red light. Additionally, the sensor units may be configured to indicate to the user which sensor units are actively reporting data from onboard sensors to the thermostat and/or which sensor units are controlling the thermostat preferentially.

The sensor unit may include features that facilitate integration of the sensor unit into a space (e.g., a room, a part of a room, etc.). The sensor unit may be configured to occupy a very small volume of space on a table or wall. The sensor unit may include an interchangeable faceplate that allows an appearance (e.g., a color, a texture, etc.) of the sensor unit to be modified to better suit the space or a user's preferences. The sensor unit may include perimeter lighting on one or more sides of the sensor unit and a light reflecting and/or channeling mechanism to create an illuminating effect on a wall proximate to the sensor unit. The details of the foregoing depiction will be more fully explained by reference to various individual embodiments.

Physical Features

Figure 2:
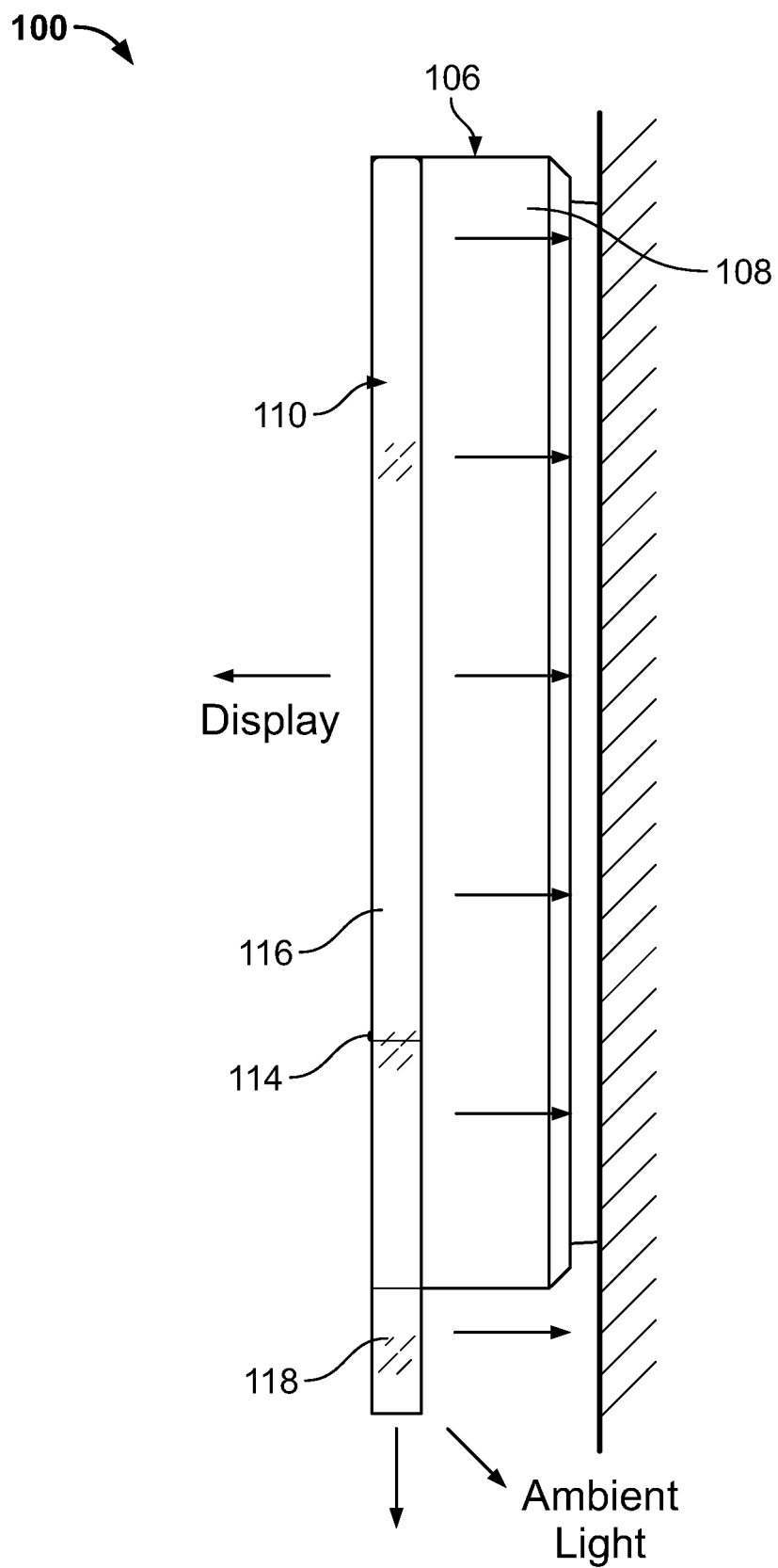
FIG. 2 is a side view of the remote sensor unit of FIG. 1, according to an exemplary embodiment.

Referring now to FIGS. 1-2, a multi-function remote sensor unit 100 (e.g., sensor unit, remote sensing device, etc.) is shown, according to an exemplary embodiment. The sensor unit 100 is configured to be communicatively coupled to a main control unit that is located remote from the sensor unit 100 (e.g., in a different room of a building, in a different location within a room where the sensor unit 100 is located, etc.). In various embodiments, the main control unit is a thermostat that is configured to control HVAC equipment (e.g., an air conditioner, a furnace, air vent dampers, blowers, etc.). In other embodiments, the main control unit is a wireless electronic device such as a cellular phone, a laptop computer, etc. Additionally, the sensor unit 100 is shown to be communicably coupled to a controlled device 101. The controlled device 101 may be disposed within the same space as the sensor unit 100. The controlled device 101 may be any piece of controllable building equipment, including but not limited to HVAC equipment such as smart vents, dampers, air conditioning equipment, and heating equipment; or non-HVAC equipment such as lighting systems, blind control systems, security systems, entertainment devices or systems, refrigeration systems, etc.

Figure 3:
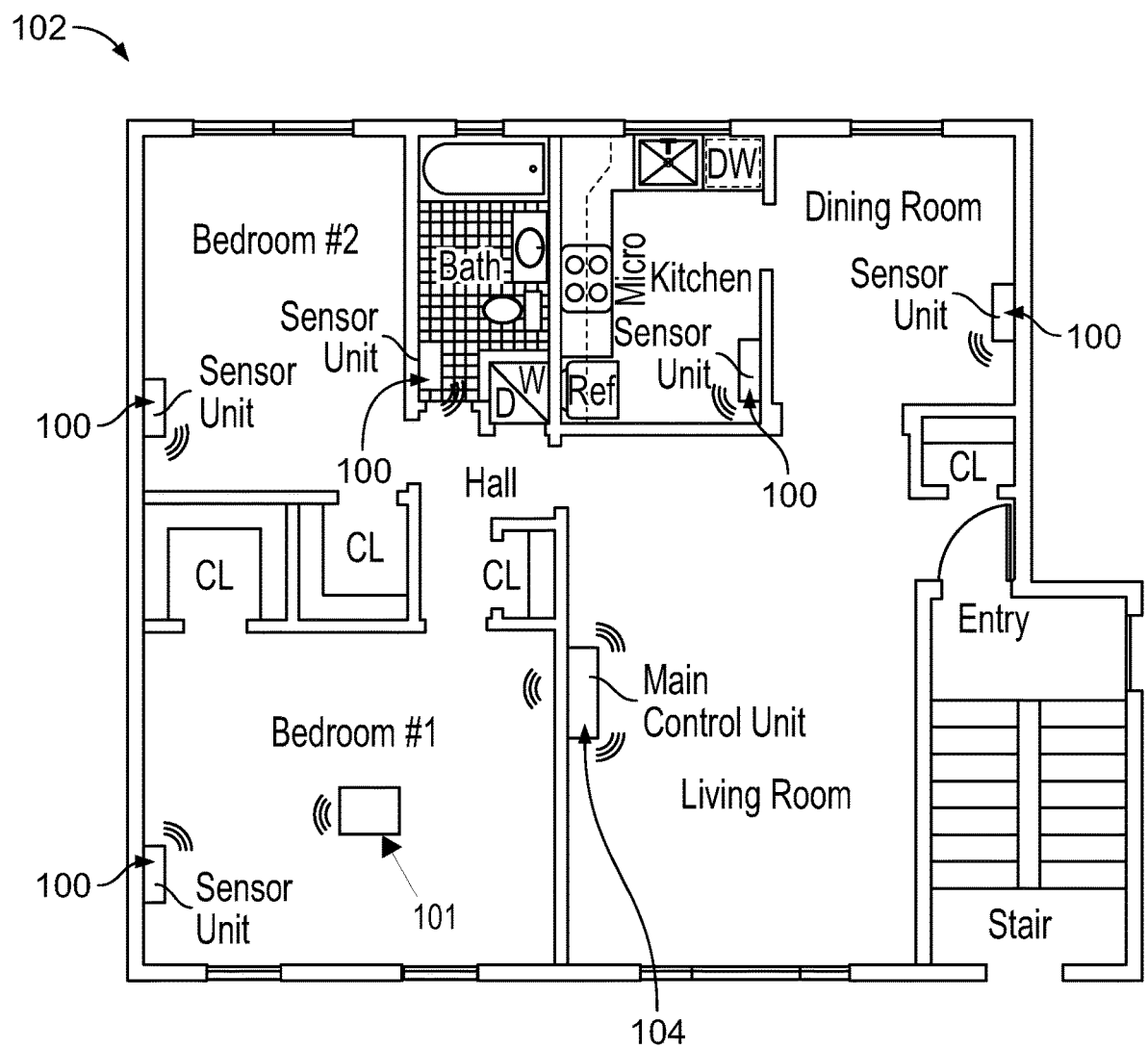
FIG. 3 is a schematic illustration of a HVAC control system for a residence, according to an exemplary embodiment.

The sensor unit 100 may be a standalone sensor unit or one of a plurality of sensor units 100 disposed throughout a building (e.g., a residence, a commercial building, etc.). In the exemplary embodiment of FIG. 3, the sensor unit 100 is one of a plurality of sensor units 100 located within a residence 102. Each sensor unit 100 is located remotely from the other sensor units 100. As shown in FIG. 3, each sensor unit 100 is located within a different room or zone (e.g., a living room, a first bedroom, a second bedroom, a bathroom, a kitchen, a dining room, etc.) of the residence 102 and configured to communicate wirelessly with a main control unit, shown as thermostat 104. The thermostat 104 may be installed in one of the rooms or zones. For example, FIG. 3 shows a thermostat 104 installed in the living room. The thermostat 104 may serve as a central control hub for monitoring environmental conditions and controlling various devices throughout the home. The sensor units 100 may be configured to measure environmental conditions within each room or zone and to receive user input (e.g., voice commands via a microphone, etc.). For example, each sensor unit may include a plurality of sensors (e.g., a temperature sensor, a humidity sensor, a smoke detector, a light sensor, a camera, a motion sensor, etc.) configured to measure variables such as temperature, humidity, light, etc. in the room or zone in which the sensor unit 100 is installed.

As shown in FIGS. 1-2, each sensor unit 100 includes a housing 106. Housing 106 provides a structure to mount the sensor unit 100 to a wall or other surface and/or to support the sensor unit 100 on a surface such as a side table, dresser, countertop, etc. The housing 106 may be formed from a variety of materials (e.g., polymers, metals, composite materials, laminates, etc.) and may have a variety of different appearances or finishes. The housing 106 may contain a variety of electronic components configured to i) perform control functions (e.g., a circuit board, memory, a processor, etc.), ii) facilitate communications with remote sensor units, thermostats, equipment, or a combination thereof (e.g., a WiFi transceiver, a cellular transceiver, a communications interface, etc.), and/or iii) provide features for visual reporting of different events to a user.

Figure 4A:
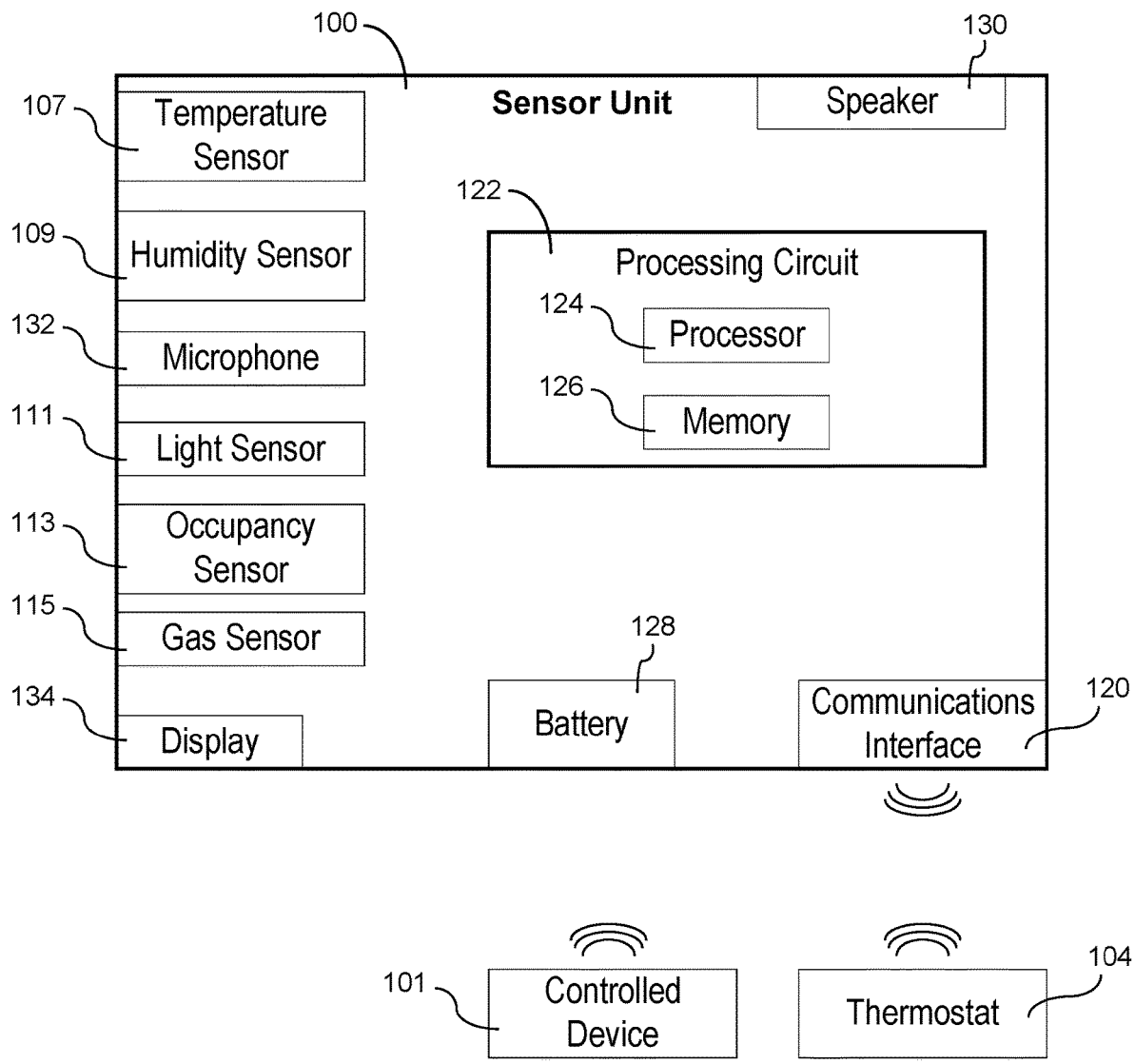
FIG. 4A is a block diagram of the functional components of a remote sensor unit, according to an exemplary embodiment.
Figure 4B:
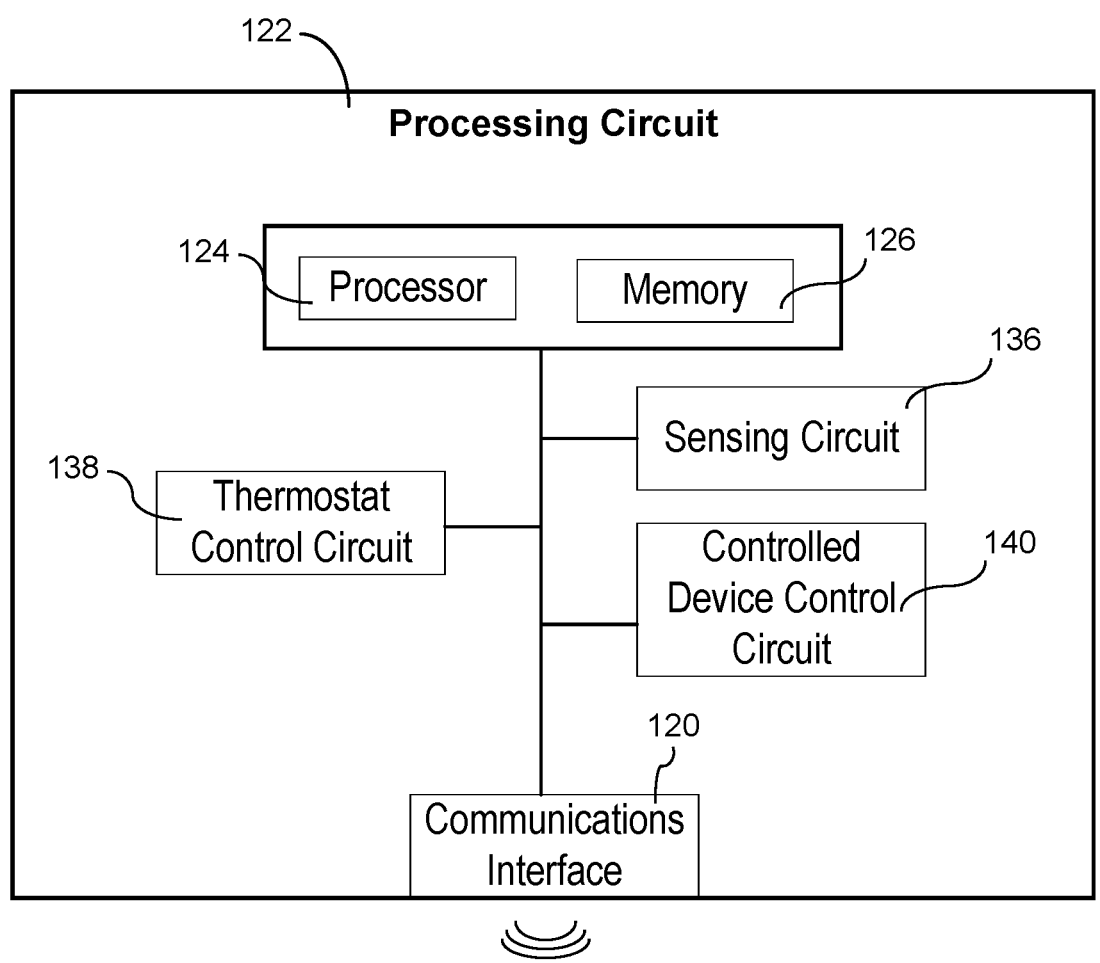
FIG. 4B is a block diagram of a processing circuit for the remote sensor unit of FIG. 4A, according to an exemplary embodiment.

FIG. 4A shows electronic components that are included with the sensor unit 100 and integrated with the housing 106, according to an exemplary embodiment. FIG. 4B shows a block diagram for a processing circuit 122 of the sensor unit 100, according to an exemplary embodiment. As shown in FIG. 4A, the sensor unit 100 includes onboard sensors including a temperature sensor 107, humidity sensor 109, light sensor 111, occupancy sensor 113, and an air quality sensor, shown as gas sensor 115. The occupancy sensor 113 may include an infrared sensor or radar. The occupancy sensor 113, in addition to detecting the presence of an individual within the space, may be configured to measure or otherwise determine other health attributes of the individual. For example, the occupancy sensor 113 may be configured to determine a heart rate via body heat fluctuations detected by the infrared sensor or a fever based on elevated body heat (e.g., body heat measurements above 98.6° or another suitable threshold). Such measurements may be particularly advantageous in care facilities where a person's vital information (e.g., vital) need to be continuously monitored such as a nursing home, daycare, etc. Among other benefits, health data may be obtained without the use of cameras or other intrusive equipment.

The gas sensor may be included as a single onboard sensor or as multiple onboard sensors. The gas sensor is configured to measure a quality of air in a space of a building. The sensor unit 100 may be configured to report the quality back to the thermostat 104, which may activate HVAC equipment (e.g., a blower, an air conditioning system, a damper in an air vent to a room of the building where the sensor unit 100 is located, etc.) to provide fresh air to the space or to modify the temperature of the space and thereby improve air quality within the space. Additionally, the sensor unit 100 may be configured to determine a condition of the room or space based on the quality and to control the controlled equipment 101 based on the quality. For example, the sensor unit 100 may be configured to activate a fan in the room to circulate air and improve the quality (e.g., reduce an amount of CO, CO2, and/or VOC within the room, etc.). Other embodiments may include more or fewer onboard sensors.

As shown in FIG. 4A, the sensor unit 100 includes a communications interface 120 and a processing circuit 122. In an exemplary embodiment, the communications interface 120 for the sensor unit 100 is configured for bi-directional communication with the thermostat 104. In other words, the communications interface 120 for the sensor unit 100 is configured to both transmit data to and receive data from a communications interface of the thermostat 104. In various embodiments described herein, the communications interface 120 is configured to communicate data received from the onboard sensors to the thermostat 104. For example, the communications interface 120 may report an occupancy status, a temperature, a humidity, an air quality, etc. to the thermostat 104, which may activate HVAC equipment to adjust one of these parameters in the space where the sensor unit 100 is located. The communications interface 120 may also be configured to receive data from the thermostat 104. For example, the thermostat 104 may transmit data to the sensor unit 100 indicating an operating condition for the HVAC equipment (e.g., whether a furnace, air conditioning system, blower, etc. has been activated by the thermostat 104).

The communications interface 120 for the sensor unit 100 is also configured to transmit data to the controlled device 101 (e.g., via Bluetooth, low powered radio, or another suitable wireless transfer method). For example, the communications interface 120 may be configured to transmit a control signal to the controlled device 101 to activate, deactivate, or otherwise effect operation of the controlled device 101. The communications interface 120 may also be configured to receive data from the controlled device 101 (e.g., operational status, health data, etc.). Additionally, the communications interface 120 for the sensor unit 100 may be configured to receive data from other sensor units 100 within the building, mobile devices, etc. The data may include information regarding an occupancy of other spaces within the building, another condition of the other spaces, and/or a health of the other sensor units 100 (e.g., whether any of the sensor units 100 are running low on battery power, if any one of the sensor units 100 is having connectivity issues, etc.). For example, the health of the sensor unit 100 or other controlled equipment/devices could be reported by the sensor unit 100, via the communication interface 120, as a notification to a user device or a third-party supplier (e.g., a vendor or supplier of the sensor unit 100). The user or supplier, in response to the notification, could take action to correct the issue before the sensor unit 100 stops functioning (e.g., replace battery, issue warranty replacement for the sensor unit 100 or sensor unit 100 components, etc.).

In some embodiments, the sensor unit 100 is configured to release control over the controlled device 101 and/or thermostat 104 in response to self-diagnostics indicating a health issue with the sensor unit 100. For example, the sensor unit 100 may be configured to release control over any independent air conditioning units within the space to a different device (e.g., the thermostat 104, another sensor unit 100, etc.). In a scenario where control is provided to the thermostat 104, the independent air conditioning unit may be controlled based on sensor data and/or a condition reported by other sensor units 100 within the building. In other words, the thermostat 104 will provide the primary override control until it receives an indication from the sensor unit 100 that it is fully operative again (e.g., that the health of the sensor unit 100 exceeds a predefined threshold, etc.).

The sensor unit 100 may share sensor data and/or space condition information with other remote sensor units 100 within the building, with the user control device, and/or with the thermostat 104 to improve the overall energy efficiency of the building control system. For example, in an embodiment where multiple spaces within the building (associated with multiple sensor units 100) require conditioned air, the building management system may be configured to de-stress the controlled equipment/devices in a manner that reduces the risk of maintenance issues or equipment life (e.g., by reducing a duty cycle of the equipment to below a predefined threshold, by selectively cooling individual spaces independently in a predefined order, etc.).

Figure 5A:
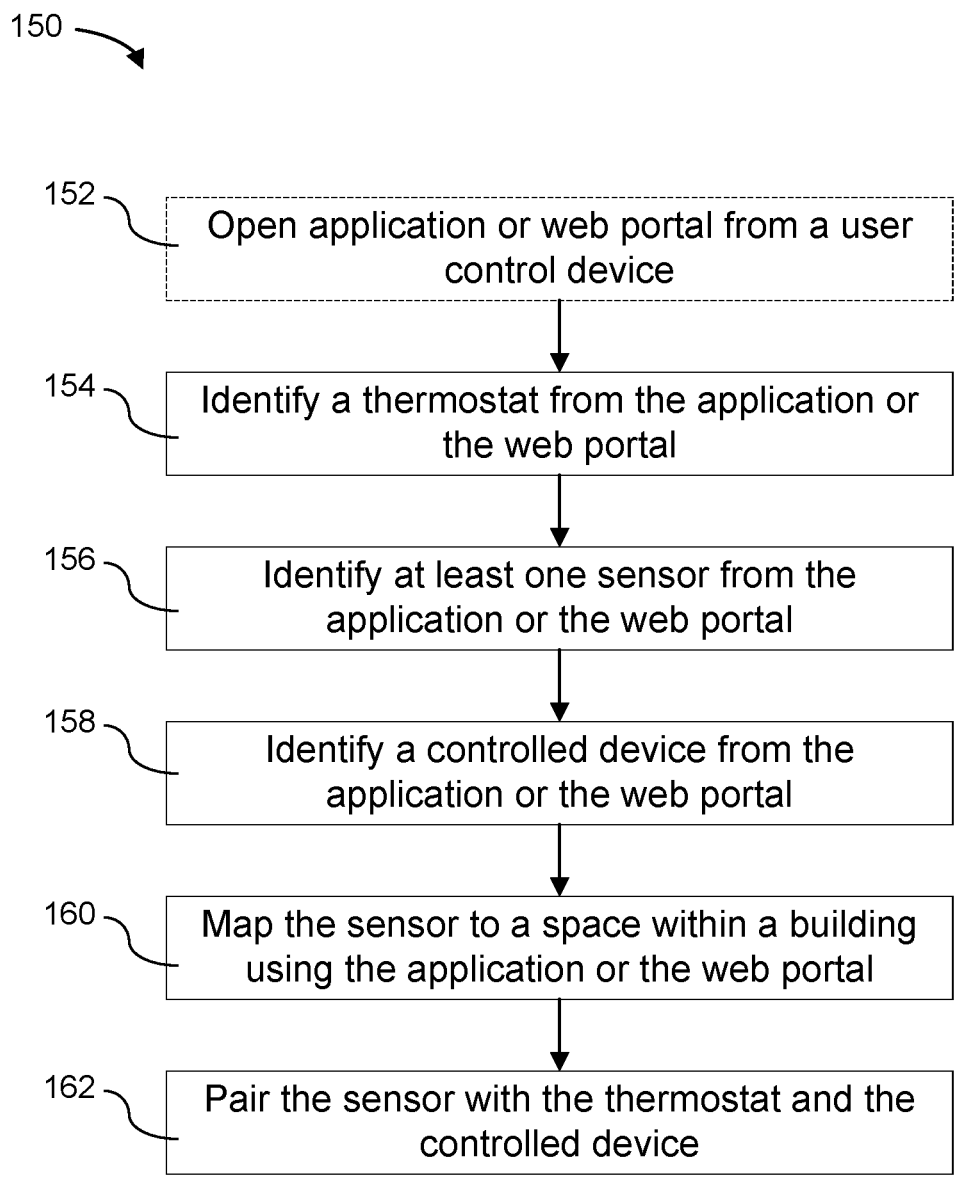
FIG. 5A is a schematic illustration of an operation to synchronize a remote sensor unit with a thermostat, according to an exemplary embodiment.

The position of the sensor unit 100 may be mapped to a space within a building. Among other benefits, space recognition associated with mapping the sensor unit 100 to the space allows a control system for the thermostat 104 to direct its efforts to the space, rather than to the entire building as a whole. FIG. 5A shows a method 150 of pairing the sensor unit 100 to the thermostat 104 and/or other sensor units, according to an exemplary embodiment. The pairing operation may be performed by a user control device which may include, but is not limited to, the sensor unit 100, the thermostat 104, a desktop computer, a mobile phone, a tablet, and/or another wireless communication device.

At optional step 152, an application or web portal configured to interact with the thermostat 104 and/or sensor unit 100 is accessed. This may include accessing an app or online software interface through a web-enabled smart phone or other wireless communications device, accessing a web portal from a desktop computer, or accessing the control system directly through one of the thermostat 104 or sensor unit 100, among various alternatives. At 154, the thermostat 104 is identified. The thermostat 104 may be identified by selecting a serial number or other identifier for the thermostat 104 (e.g., an internet protocol address on a wireless area network, a name of the thermostat 104 on a Bluetooth network, etc.) from the application or web portal. At 156, the sensor unit 100 is identified. Similar to the thermostat 104, the sensor unit 100 may be identified from the application or web portal by identifying a serial identification number or a name of the sensor unit 100, and/or another suitable identifier. At 158 a controlled device 101 is identified, which may be performed in a similar manner to the identification of the sensor unit 100 and the thermostat 104. At 160, the sensor unit 100 is mapped to a space within a building (e.g., residence, commercial property, etc.). In other embodiments, multiple sensor units 100 may be mapped to different spaces simultaneously (e.g., at the same time, in a single iteration, without having to completely setup or pair each sensor individually after the mapping operation). The mapping operation may be performed using the application or web portal, for example, by selecting various controlled devices/equipment that are associated with the space in which the sensor unit 100 is located (or in other spaces within the building) and then matching the selected controlled devices with the identifier for the sensor unit 100. The controlled devices may include, but is not limited to, air duct vents (e.g., smart vents) within the space, electronic dampers configured to reroute air from air conditioning or heating equipment to the space, fans within the space, window shades (e.g., electronic blinds) configured to control an amount of ambient light provided to the space, lights within the space, and any other control equipment associated with the space or in other spaces within the building (e.g., air conditioning or heating equipment that can be used to route conditioned air to the space). In other embodiments, the application or web portal may present to the user a two dimensional map of the home (e.g., see FIG. 3) and allow the user to drag and drop the sensor unit 100 to the room or space within a room that the sensor unit 100 is located.

At 162, the sensor unit 100 is paired to the thermostat 104 and the controlled device 101. As with other operations, block 162 may be performed using the application or web portal, for example, by selecting the identifier for both the thermostat 104, the controlled device 101, and the sensor unit 100. In other embodiments, block 162 may be automatically performed by the application (e.g., if only one thermostat 104 or controlled device 101 is present in the building control system, etc.). In other embodiments, the method 150 may include additional, fewer, and/or different operations.

In an exemplary embodiment, the thermostat 104 receives a measurement of a condition from a sensor unit 100 within an occupied space of a building. The condition may be, for example, a temperature of the space, a humidity of the space, an air quality of the space (e.g., a CO2 level, or a VOC level), an amount of ambient lighting within the space, an occupancy condition such as whether the space is occupied, and/or another measurable condition. The thermostat 104, as a result of mapping a location for the sensor unit 100, is able to control HVAC equipment to modify conditions (e.g., temperature, humidity, air quality, etc.) at the location of the sensor unit 100 (e.g., in a room or space where the sensor unit 100 is located, in a region of a room proximate to the sensor unit 100, etc.). Advantageously, mapping the location of each sensor unit 100 and pairing each sensor unit 100 with controls that are applicable to the space allows for the conditions of each space (where a sensor unit 100 is installed) to be controlled independently from one another. For example, in a multi-unit apartment building, a sensor unit 100 may be placed in each one of the apartment units. The thermostat 104 receives sensor data from each sensor unit 100 and controls each apartment unit independently from other units. Among other benefits, the independent control functionality may reduce overall energy consumption by limiting the amount of air conditioned or heated air that is required at any given time to only the specific units/spaces for which the air conditioned or heated air is required (e.g., for which sensor data received from the sensor unit 100 exceeds or is otherwise outside of a sensor data threshold).

The communications interface 120 may include wired or wireless interfaces (e.g., jacks, antennas, transmitters, receivers, transceivers, wire terminals, etc.) for conducting data communications with various systems, devices, or networks. For example, the communications interface 120 may include an Ethernet card and port for sending and receiving data via an Ethernet-based communications network and/or a WiFi transceiver for communicating via a wireless communications network. The communications interface 120 may be configured to communicate via local area networks or wide area networks (e.g., the Internet, a building WAN, etc.) and may use a variety of communications protocols (e.g., BACnet, IP, LON, Zigbee, Bluetooth, etc.). The sensor unit 100 may also use the communications interface 120 to communicate with other sensor units 100, mobile devices within the home, a home network, or other systems or devices.

The processing circuit 122 is shown to include a processor 124 and memory 126. The processor 124 may be a general purpose or specific purpose processor, an application specific integrated circuit (ASIC), one or more field programmable gate arrays (FPGAs), a group of processing components, or other suitable processing components. The processor 124 may be configured to execute computer code or instructions stored in memory 126 or received from other computer readable media (e.g., CDROM, network storage, a remote server, etc.). The memory 126 may include one or more devices (e.g., memory units, memory devices, storage devices, etc.) for storing data and/or computer code for completing and/or facilitating the various processes described in the present disclosure. The memory 126 may include random access memory (RAM), read-only memory (ROM), hard drive storage, temporary storage, non-volatile memory, flash memory, optical memory, or any other suitable memory for storing software objects and/or computer instructions. The memory 126 may include database components, object code components, script components, or any other type of information structure for supporting the various activities and information structures described in the present disclosure. The memory 126 may be communicably connected to the processor 124 via the processing circuit 122 and may include computer code for executing (e.g., by the processor) one or more processes described herein.

As described above, the sensor unit 100 is configured to report a condition of a space to the thermostat 104 and/or other sensor units 100 to control the condition of the space. The sensor unit 100 is also configured to control the controlled device 101 (independently from the thermostat 104) based on the condition of the space and/or sensor data. As shown in FIG. 4B, the processing circuit 122 includes a sensing circuit 138, a thermostat control circuit 138, and a controlled device control circuit 140. The sensing circuit 138, the thermostat control circuit 138, and the controlled device control circuit 140 may be machine or computer-readable media that is executable by the processor 124. In other embodiments, the sensing circuit 138, the thermostat control circuit 138, and the controlled device control circuit 140 may be embodied as one or more circuitry components. The sensing circuit 136 may be configured to receive sensor data from each one of a plurality of onboard sensors within the sensor unit 100. The sensing circuit 138 may additionally be configured to determine a condition of the space based on sensor data. In some exemplary embodiments, the condition is at least one of a temperature of the space, a humidity of the space, an air quality of the space, and/or an amount of lighting within the space. The thermostat control circuit 138, in response to a determination that the sensor data exceeds a sensor data threshold (or based on the condition of the space reported by the sensor unit 100), may be configured to generate a control signal to cause the thermostat 104 to selectively modify the condition of the first space independently from the other spaces (e.g., based on the control equipment associated with the space that the sensor unit 100 is mapped to, etc.). It should be appreciated that, in other exemplary embodiments, the condition of the first space may also be altered in combination with other spaces.

The controlled device control circuit 140 is configured to generate a control signal based on the sensor data and/or the condition reported by the sensing circuit 136 to activate, deactivate, or otherwise effect operation of the controlled device 101. By way of example, in some embodiments, the onboard sensor is an air quality sensor (e.g., gas sensor 115 as shown in FIG. 4A). The sensor data may be air quality data indicative of an air quality within the space. For example, the air quality may be an amount of CO2 within the space and/or an amount of VOCs within the space. In any instance where either the amount of CO2 or VOCs is above a predefined air quality threshold within the space (e.g., a threshold beyond which medical symptoms may arise such as dizziness, etc.), the controlled device control circuit 140 generates a control signal to cause the controlled device 101 to selectively modify a flow rate of air provided to the space independently from the other spaces. For example, the control signal may cause the activation of damper controls (e.g., to open louvers within an HVAC ducting system) to redirect heated or cooled air toward the space, activation of a fan within the space, activation of a garage door (e.g., to open and allow fresh air to enter a garage space), activation or opening of a vent, etc.

Figure 5B:
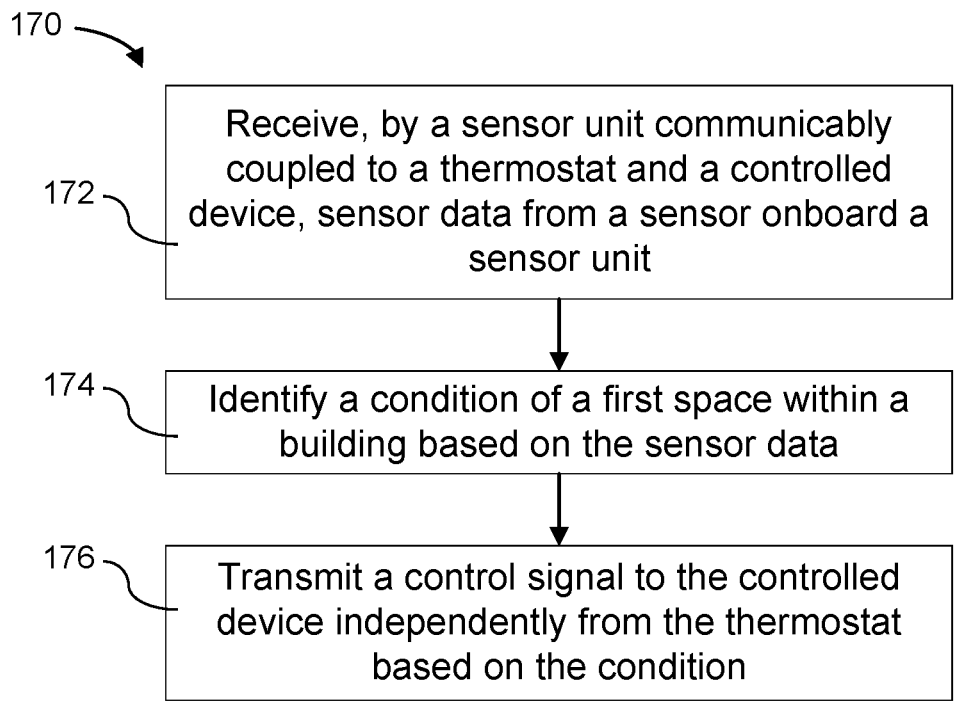
FIG. 5B is a schematic illustration of an operation to control a controlled device by a remote sensor unit, according to an exemplary embodiment.

Referring now to FIG. 5B, a method 170 of controlling the controlled device 101 by the sensor unit 100 is shown, according to an exemplary embodiment. At 172, the sensor unit 100 (e.g., the processing circuit 122, the sensing circuit 136) receives sensor data from an onboard sensor. For example, block 172 may include receiving air quality data from an air quality sensor. At 172, the sensor unit 100 identifies a condition of a first space within a building based on the sensor data. Block 172 may include averaging sensor data over a predefined time interval or converting voltage measurements from the onboard sensor into temperature, humidity, CO2 content, VOC content, light intensity, or another measurable environmental condition. Block 172 may additionally include combining sensor data from multiple sensors. For example block 172 may include combining VOC data with CO2 data to determine an overall air quality for the first space. At 176, the sensor unit 100 transmits a control signal to the controlled device 101 independently from the thermostat based on the condition. For example, the sensor unit 100 may transmit a control signal to a duct controller or air vent controller based on a determination that the air quality within the first space is above or below a predefined threshold value (e.g., that the air quality is above a safe level below which an occupant may become dizzy or lose consciousness, etc.). The control signal may cause the duct controller or air vent controller to activate (e.g., to open the duct leading air into the first space). In other exemplary embodiments, the controlled device 101 may be a garage door, a fan, a light, an automatic window blind, or any other controllable equipment.

The sensor unit 100 may be configured to be remotely powered. In the embodiment of FIG. 4A, the sensor unit 100 includes an interchangeably battery 128. In an exemplary embodiment, the battery 128 may be a coin or button cell battery that occupies a minimal amount of volume within the sensor unit 100 (e.g., the housing 106). As shown in FIG. 4A, the sensor unit 100 may include a variety of components configured to facilitate communication with a user, including a speaker 130, a microphone 132, and a display 134. The microphone 132 and the display 134 may be configured to receive commands from the user. The display 134 may also be configured to provide visual indication to communicate a status to the user. In some embodiments, the status is a pairing status confirming that the sensor unit 100 is paired to a thermostat or home control system. In other embodiments, the status is an operational status of one or a combination of the sensor unit 100 (e.g., a health of the sensor unit such as a remaining battery life of the sensor unit 100, an amount of ambient lighting in the space where the sensor unit 100 is located, etc.) and HVAC equipment. For example, the status may be an operational status of an air conditioning system, air flow control system (e.g., damper position), a heating system, etc. The display 134 may use any of a variety of display technologies such as light emitting diode (LED), organic light-emitting diode (OLED), liquid-crystal display (LCD), organic light-emitting transistor (OLET), surface-conduction electron-emitter display (SED), field emission display (FED), digital light processing (DLP), liquid crystal on silicon (LCoC), or any other display technologies known in the art. In some embodiments, the display 134 may alternatively or additionally be configured as a touch-sensitive display.

In the exemplary embodiment of FIGS. 1-2, the housing 106 includes a base 108, a face plate 110, a sensor window 112, and a display, shown as LED indicator 114. The base 108 defines an internal cavity configured to receive onboard sensors and other electronic components. In the embodiment of FIGS. 1-2, the onboard sensors, the processor 124, the memory 126, and the communications interface 120 (see also FIG. 4) are all disposed within the internal cavity. The base 108 is configured to facilitate coupling (e.g., mounting) of the sensor unit 100 to a wall or other surface within a building. As shown in FIG. 2, the base 108 is configured to mount the sensor unit 100 to a wall such that a longest edge of the face plate 110 is oriented vertically with respect to a ground surface (e.g., a floor of the building). The base 108 may further include a retractable stand (not shown) configured to support the sensor unit 100 on a surface (e.g., a level surface within the building space such as a side table, dresser, countertop, etc.). As shown in FIG. 2, the base 108 separates each of the face plate 110, the sensor window 112, and the LED indicator 114 from the wall.

The face plate 110 shown in FIG. 1 takes the form of a rectangular cover disposed on a forward facing portion of the housing 106. The face plate 110 includes an opaque portion 116 and a transparent portion 118. The transparent portion 118 is disposed along a perimeter of the forward facing portion of the housing 106 such that it at least partially surrounds the opaque portion 116, the LED indicator 114, and the sensor window 112. In alternative embodiments, the transparent portion 118 may be coupled (e.g., affixed, mounted, etc.) to the sensor window 112 and/or the base 108. In the embodiment of FIGS. 1-2, the face plate 110 is removably coupled to the base 108 (e.g., using clips, a press/interference fit connection, etc.). The opaque portion 116 may be made from one of a variety of different polymers (e.g., plastics), composites, metals, etc. The opaque portion 116 of the face plate 110 includes textures and colors that are suited to blend in with an environment surrounding the sensor unit 100. The opaque portion 116 of the face plate 110 is configured to be interchangeable so that the colors and textures may be modified to suit the needs of a user or to better blend in with the environment surrounding the sensor unit 100.

The sensor window 112 is disposed beneath the opaque portion 116 of the face plate 110. Similar to the opaque portion 116, the sensor window 112 is substantially rectangular in shape. The sensor window 112 covers the occupancy sensor (e.g., an infrared sensor), which is configured to detect an occupancy condition for a space. The sensor window 112 is configured as an optical window to allow the sensor unit 100 to better sense the occupancy condition (i.e., whether an individual has entered the space) within the room or zone in which the sensor unit 100 is installed.

The LED indicator 114 for the sensor unit 100 is disposed between the opaque portion 116 and the sensor window 112. The LED indicator 114 is configured as a thin horizontal bar that extends along a length of the opaque portion 116 and/or sensor window 112. The LED indicator 114 is configured to report a status of the sensor unit 100, the controlled device 101, and/or thermostat 104 to a user by changing colors, blinking, and/or illuminating along only a portion of the LED indicator 114. In an exemplary embodiment, the LED indicator 114 is configured to communicate to a user one or a combination of a pairing status between the sensor unit 100 and thermostat 104, a pairing status between the sensor unit 100 and the controlled device 101, an equipment operational status (e.g., an HVAC equipment operational status), an operating condition of the sensor unit 100, and an indication of a measurement received from one of the onboard sensors.

By way of example, in the pairing operation shown in FIG. 5A, the location of the sensor unit 100 (shown in FIGS. 1-2) is mapped and recognized by the thermostat 104 and the controlled device 101. The sensor unit 100 may be configured to communicate the success or failure of the pairing operation using the LED indicator 114 by emitting a blinking light (e.g., characterized by a number of blinks, blink speed, etc.) that depends on the status of the pairing operation. Alternatively, the LED indicator 114 may be configured to emit different colored lights depending on the status of the pairing operation (e.g., green to indicate a successful pairing operation, red to indicate a failed pairing operation, etc.).

The sensor unit 100 may also be configured to transmit a signal from one of the onboard sensors to the thermostat 104. The signal may indicate, for example, an air quality condition, a temperature, a humidity, an occupancy condition, or any other measured condition. The thermostat 104 may be configured to activate an air conditioning system, a heating system, a fan, and/or other HVAC equipment to direct air to the location of the sensor unit 100 based on the information received from the sensor unit 100 (and including an occupancy condition reported by the sensor unit 100). The thermostat 104 may feed an operational status of the air conditioner back to the sensor unit 100, which may report the operational status to the user via the LED indicator 114, for example, by emitting a colored light (e.g., a blue light). The color of the light emitted by the LED indicator 114 may vary depending on the operational status received by the sensor unit 100 from the thermostat 104. For example, a blue light may indicate that the space proximate to the sensor unit 100 is being cooled, whereas a red light may indicate that the space proximate to the sensor unit 100 is being heated. Similarly, the LED indicator 114 may be used to communicate an operational status of the controlled device 101.

In some embodiments, the LED indicator 114 may be used to communicate a combination of a condition of the space and an operational status of controlled equipment (e.g., the thermostat 104, the controlled device 101, etc.). For example, the LED indicator 114 may emit a static red light (e.g., a red colored light that doesn't blink or animate) to indicate very poor air quality and an inability of the sensor unit 100 to control/mitigate the air quality. A flashing red light may indicate very poor air quality but where the controlled device 101 or thermostat 104 is taking action to improve the air quality (e.g., by directing conditioned air into the space, etc.). A similar logic for the LED indicator 114 may be extended to other colored light states (e.g., a yellow light to indicate poor but tolerable air quality, a green light to indicate good air quality, etc.).

The LED indicator 114 may also be used to communicate an operational status for the sensor units 100 to the user. For example, the LED indicator 114 may illuminate when the sensor unit 100 detects the user in the space proximate to the sensor unit 100 (e.g., as reported by the occupancy sensor).

For embodiments where more than one sensor unit 100 detects a user, operation of the thermostat, HVAC equipment, and/or other equipment that is communicably coupled to the sensor unit 100 may be preferentially controlled by a single one (e.g., a primary one) of a plurality of sensor units 100. In other words, sensor data and/or control signals provided by the primary one of the plurality of sensor units 100 may override sensor data and/or control signals provided by any of the other sensor units 100. The primary sensor unit 100 may be determined based on occupancy data from the plurality of sensor units 100 (e.g., which space within the building is occupied), or may default to a sensor unit 100 that provides control over a largest coverage area within the building (in the case where multiple spaces within the building are occupied). An intensity of the light emitted by the LED indicator 114 may indicate which of the sensor units 100 is considered as a primary sensor unit 100 for the thermostat 104 (e.g., a sensor unit having the greatest influence over the control of HVAC and/or non-HVAC equipment for the building).

The intensity of the light emitted by the LED indicator 114 (and/or any other display components) may be modified depending on an intensity of ambient light measured by the light sensor. Among other benefits, adjusting the intensity of the light based on ambient conditions may reduce user distraction and help the sensor unit 100 blend in with its surroundings, etc.). It will be appreciated that other display components may be illuminated or configured to report in different ways based on an operational status of the thermostat 104, sensor units 100, and/or HVAC and non-HVAC equipment without departing from the inventive concepts disclosed herein.

In various exemplary embodiments, the display parameters of the visual indications provided by the sensor unit 100 may be modified and/or customized based on user preferences. The display parameters may include a lighting scheme for each operating status reported by the sensor unit 100 such as whether the LED indicator 114 flickers, changes color, presents a visual animation (e.g., lights moving from side to side, etc.), and/or any other lighting parameter (e.g., color, intensity, etc.). The display parameters may be adjusted by the user control device, through an application on the user control device or a web portal.

In the exemplary embodiment of FIGS. 1-2, light emitted from the LED indicator 114 may be augmented by utilizing the transparent portion 118 of the face plate 110. More specifically, the transparent portion 118 may form a lighting frame configured to emit light (e.g., generated by the LED indicator 114 and/or other display lighting) from a wall facing surface and/or perimeter of the transparent portion 118. For example, as shown in FIG. 2, the transparent portion 118 may be positioned along the sides and bottom of sensor unit 100 and/or along any other surface or edge of the sensor unit 100. The transparent portion 118 may be configured to emit lighting through the transparent portion 118 toward the wall or surface upon which the sensor unit 100 is mounted. The transparent portion 118 may also emit light in a direction that is substantially coplanar with the face plate 110 (i.e., upward or downward in FIG. 2) and/or in a direction that is substantially perpendicular to the front surface of the face plate (i.e., away from the wall, to the left in FIG. 2).

Advantageously, light emitted from the transparent portion 118 may illuminate a wall or surface proximate to the sensor unit 100 to indicate operational conditions, at least as described in the context of the LED indicator 114 above. In some embodiments, the sensor unit 100 includes other forms of light indicators for the display (e.g., LEDs integrated along a perimeter of the face plate 110, base 108 or other positions along the housing 106) in addition to or in place of the LED indicator 114 and transparent portion 118.

The arrangement and shape of components for the housing 106 shown in the various embodiments may vary depending on the needs of the user or the environment surrounding the sensor unit 100.

Figure 6:
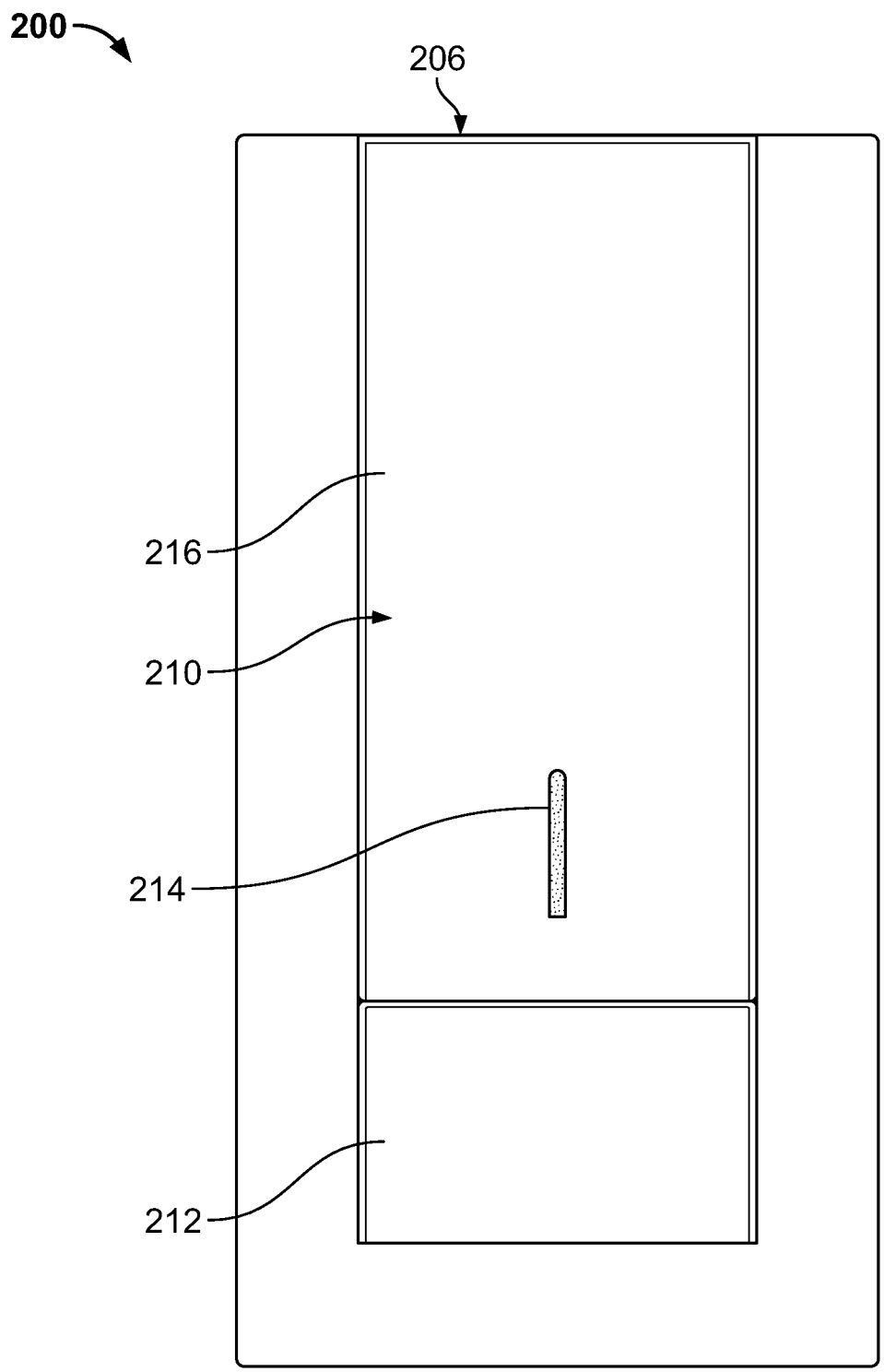
FIG. 6 is a front view of a remote sensor unit for a thermostat, according to an exemplary embodiment.

FIG. 6 shows an alternative embodiment of a sensor unit 200 that is similar to the sensor unit 100 of FIGS. 1-2. As shown in FIG. 6, the sensor unit 200 includes a housing 206 including a face plate 210, a sensor window 212, and an LED indicator 214. The LED indicator 214 is a thin vertical lighting strip. The LED indicator 214 is disposed in an opening defined by a lower portion of the face plate 210. Yet another exemplary embodiment of a sensor unit 300 is shown in FIGS. 7-11. Again, the sensor unit 300 includes a housing 306 including a base 308 and a face plate 310 attached to the base 308. The sensor unit 300 is shown in a standalone configuration characterized in that the sensor unit 300 is self-supported by the housing 306 upon a flat horizontal surface (e.g., a planar surface such as a side table, countertop, dresser, etc.). The sensor unit 300 may alternatively or additionally be configured to mount to a wall.

Figure 7:
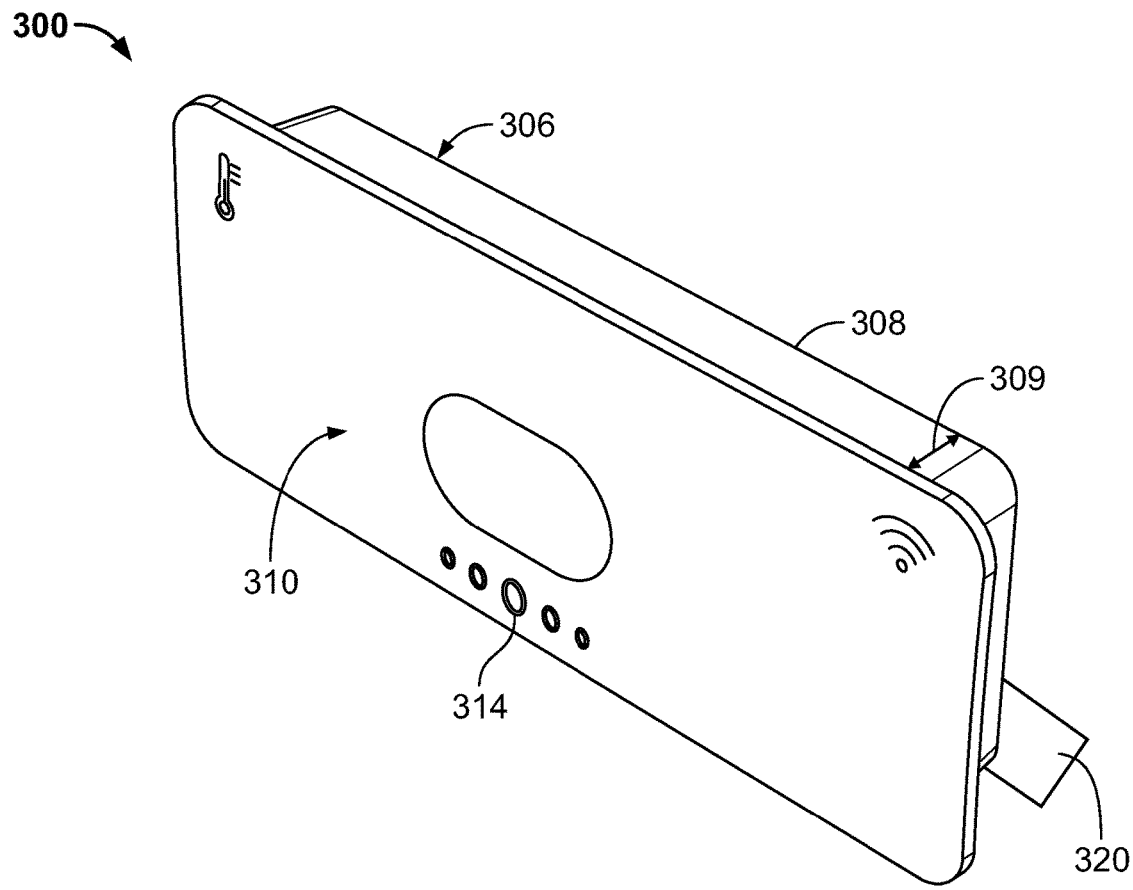
FIG. 7 is a front perspective view of a remote sensor unit for a thermostat, according to an exemplary embodiment.

As shown in FIG. 7, the sensor unit 300 includes a retractable support, shown as support 320 configured to position the sensor unit 300 in a substantially upright position such that a forward portion of the sensor unit 300 is substantially perpendicular to the flat horizontal surface. The support 320 may take a variety of forms. The support 320 may be rotatably coupled to the housing 306 and configured to rotate down and away from the housing 306 to prevent the base 308 of the housing 306 from collapsing onto the flat horizontal surface. Advantageously, this apparatus configuration may allow a user to angle the sensor unit 300 with respect to the flat horizontal surface to make the face plate 310 more viewable to the user. Alternatively, the support may be slidably coupled to the base 308. In an embodiment where the support is slidably coupled to the base, the position of the support may be adjusted by translating the support into and out of an internal cavity in the base 308. The base 308 may include features to facilitate manipulation of the support 320 between a retracted position, where the support 320 is located substantially within the internal cavity, and a supporting position, where the support 320 is in contact with the flat horizontal surface. For example, the base 308 may include one or more apertures configured to facilitate access to the support 320 when configured in the retracted position, etc.

Figure 8:
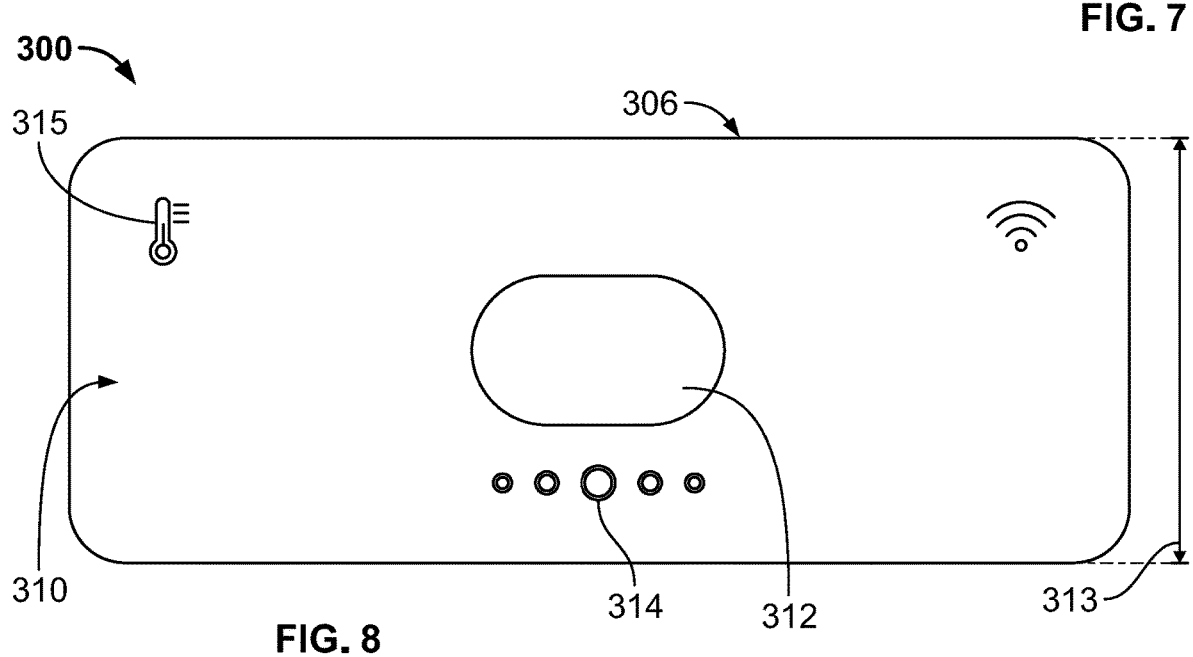
FIG. 8 is a front view of the remote sensor unit of FIG. 7, according to an exemplary embodiment.
Figure 9:
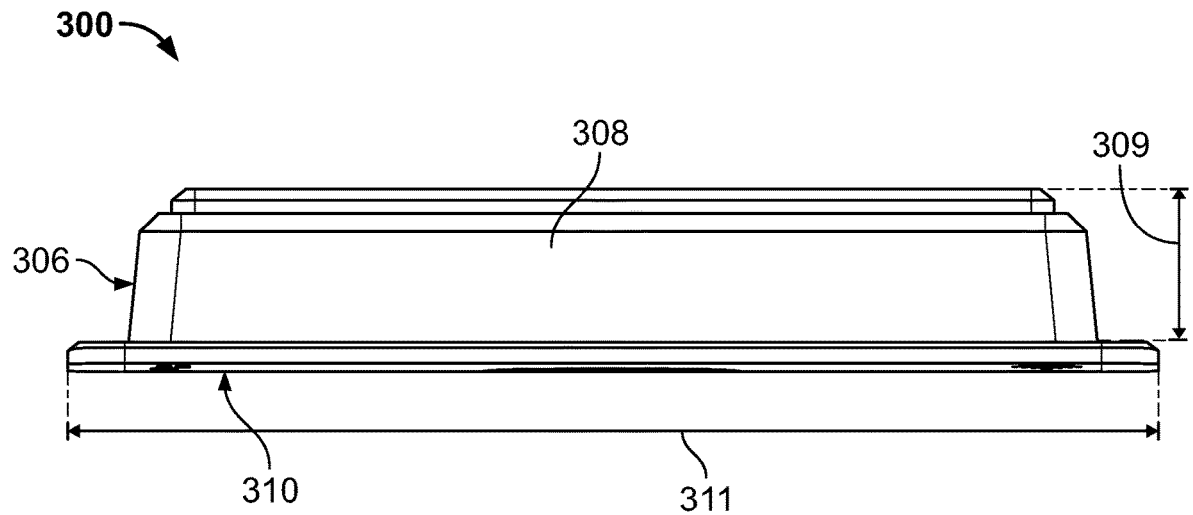
FIG. 9 is a top view of the remote sensor unit of FIG. 7, according to an exemplary embodiment.

In some embodiments, a thickness 309 of the base 308 in a direction substantially perpendicular to a forward facing surface of the sensor unit 300 is sufficient to fully support the sensor unit 300 on a flat horizontal surface. At the same time a volume of the sensor unit 300 is minimized to help the sensor unit 300 blend in with its surroundings. According to an exemplary embodiment, the thickness 309 of the base 308 (see also FIG. 9) may be on the order of 25 mm or less, 15.2 mm or less, or 13.65 mm or less. A width 311 of the sensor unit 300 (e.g., between a left side edge and a right side edge of the sensor unit 300 as shown in FIG. 9) may be on the order of 90.5 mm, 77 mm, 65 mm, or less. A length 313 of the sensor unit 300 (e.g., between a top side edge and a bottom side edge as shown in FIG. 8) may be on the order of 67.2 mm, 36.4 mm, or less. Any of these dimensions may vary depending on desired structural features for the sensor unit 300 and a number and placement of onboard sensors.

Figure 10:
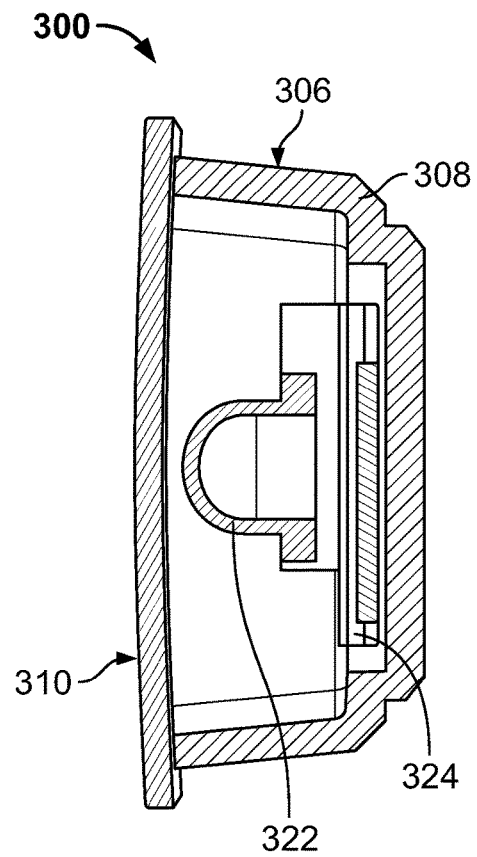
FIG. 10 is a side sectional view of the remote sensor unit of FIG. 7, according to an exemplary embodiment.

As shown in the embodiment of FIGS. 9-10, the thickness of the base 308 is sufficient to fully enclose the various electrical components contained within the housing 306. The face plate 310 is at least partially transparent an includes LED illuminated indicators including indicators 315 for power and sensor unit 300 health monitoring, as well as an LED indicator 314 whose function is to communicate an operational status to a user (including of one or a combination of an operational status of a thermostat 104, sensor units 300, and/or HVAC and non-HVAC equipment). The LED indicator 314 includes a plurality of circular lights. The LED indicator 314 may be configured to animate the lights depending on an operational condition. For example, a centermost light may be activated first, followed by lights adjacent to the centermost light (e.g., lights whose diameter is smaller than the centermost light) extending outward toward a right side edge and a left side edge of the face plate 310 depending on the operational condition. As shown in FIGS. 7-8, the face plate 310 extends beyond an outer perimeter of the base 308 forming a flange (e.g., ledge, cantilevered portion, etc.). Similar to the sensor unit 100 of FIGS. 1-2, light from the LED indicator 314 for sensor unit 300 of FIGS. 7-8 may be directed through the flange of the face plate 310 and broadcast onto a surface (e.g., a wall) located proximate to the sensor unit 300.

Figure 11:
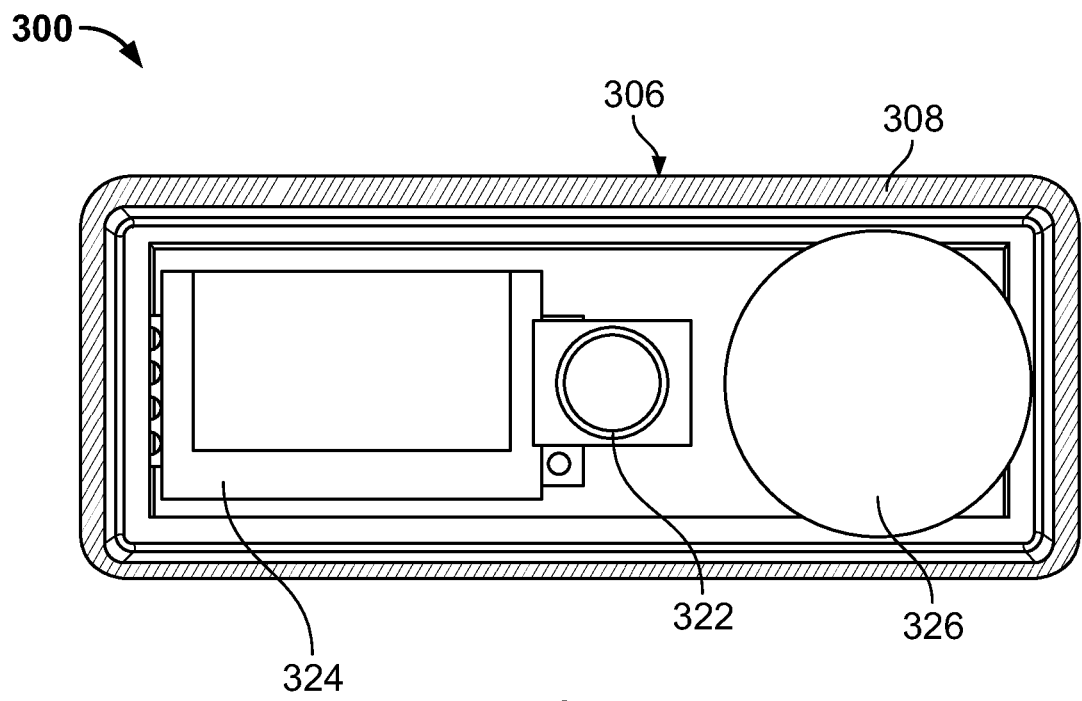
FIG. 11 is a rear view of the remote sensor unit of FIG. 7 with a rear cover removed, according to an exemplary embodiment.

As shown in FIGS. 10-11, an occupancy sensor 322 is disposed centrally within an internal cavity for the base 308. As shown in FIG. 10, a set of electronics components (e.g., onboard sensors other than the occupancy sensor 322) for the sensor unit 300 may be disposed on a printed circuit board (PCB 324). The PCB 324 and a battery 326 for the sensor unit 300 may be disposed in a portion of the internal cavity surrounding the occupancy sensor 322. The battery

Figure 12:
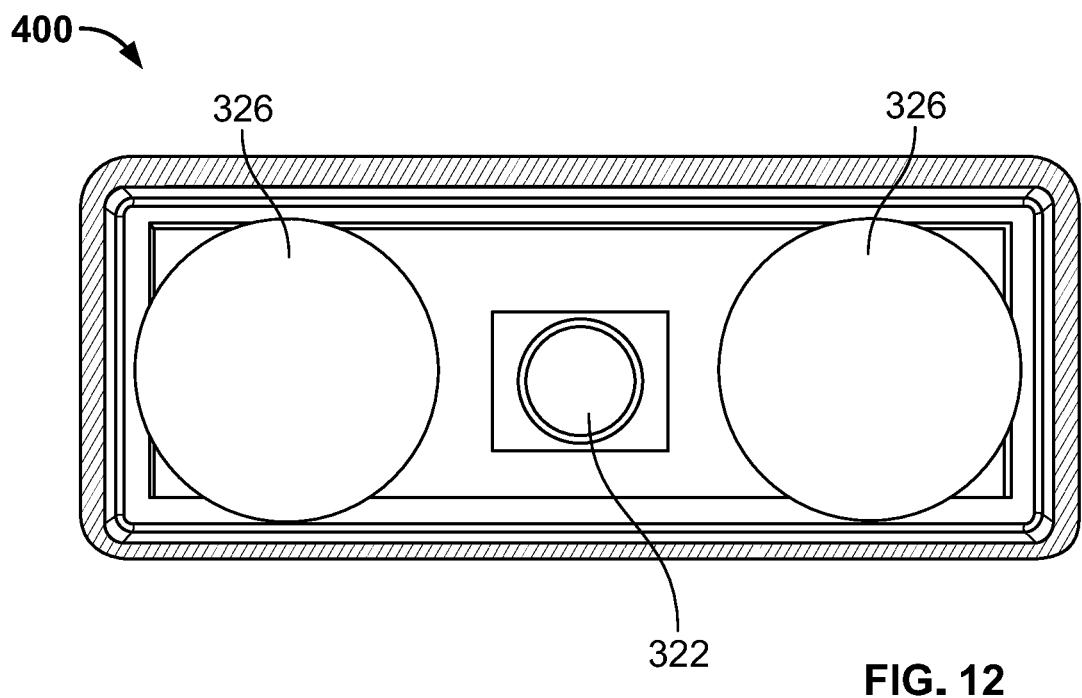
FIG. 12 is a rear view of a remote sensor unit with a rear cover removed, according to an exemplary embodiment.
Figure 13:
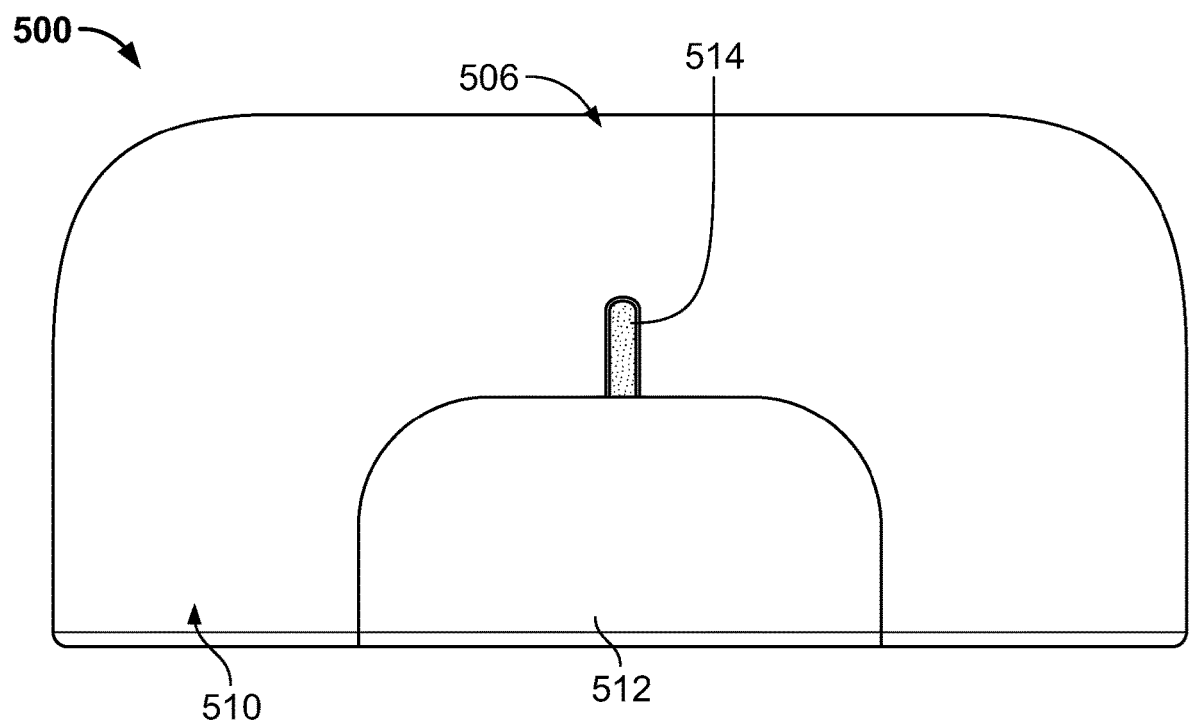
FIG. 13 is a front view of a remote sensor unit for a thermostat, according to an exemplary embodiment.

326 may be a button cell battery or another thin-profile battery to facilitate miniaturization of the sensor unit 300. An alternative embodiment of the sensor unit 300 of FIGS. 7-11 is shown in FIG. 12. In the embodiment of FIG. 12, the sensor unit 400 includes an additional battery 326 to increase the longevity of the device.

Figure 14:
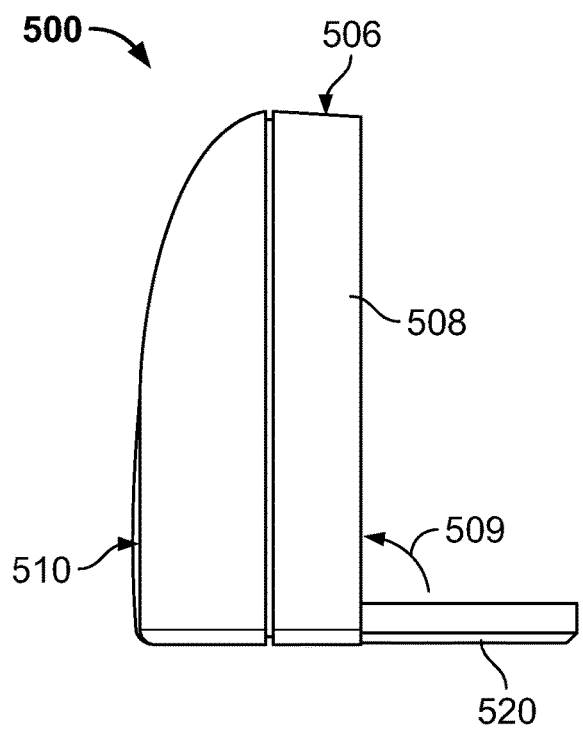
FIG. 14 is a side view of the remote sensor unit of FIG. 13, according to an exemplary embodiment.
Figure 15:
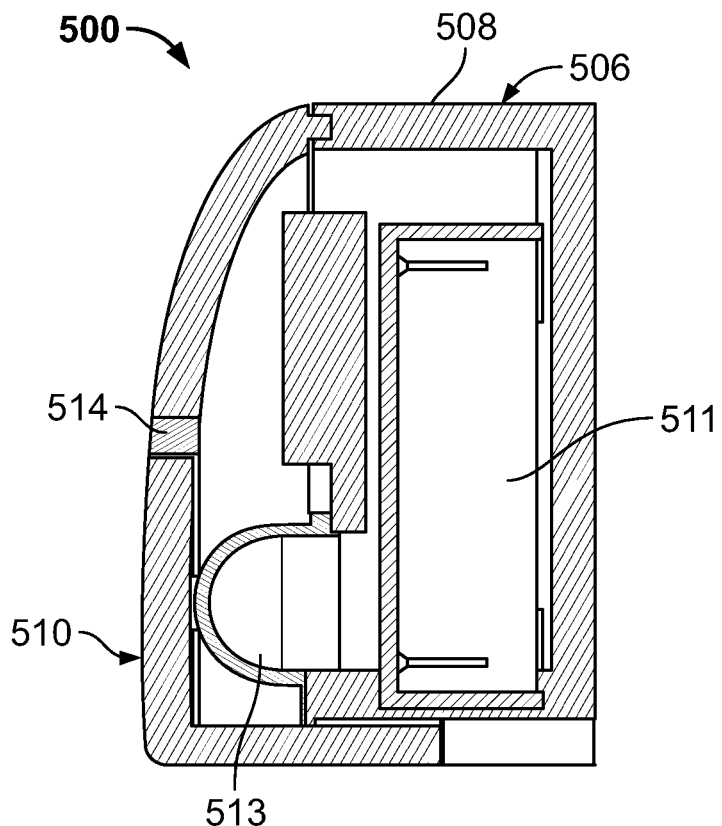
FIG. 15 is a side sectional view of the remote sensor unit of FIG. 13, according to an exemplary embodiment.
Figure 16:
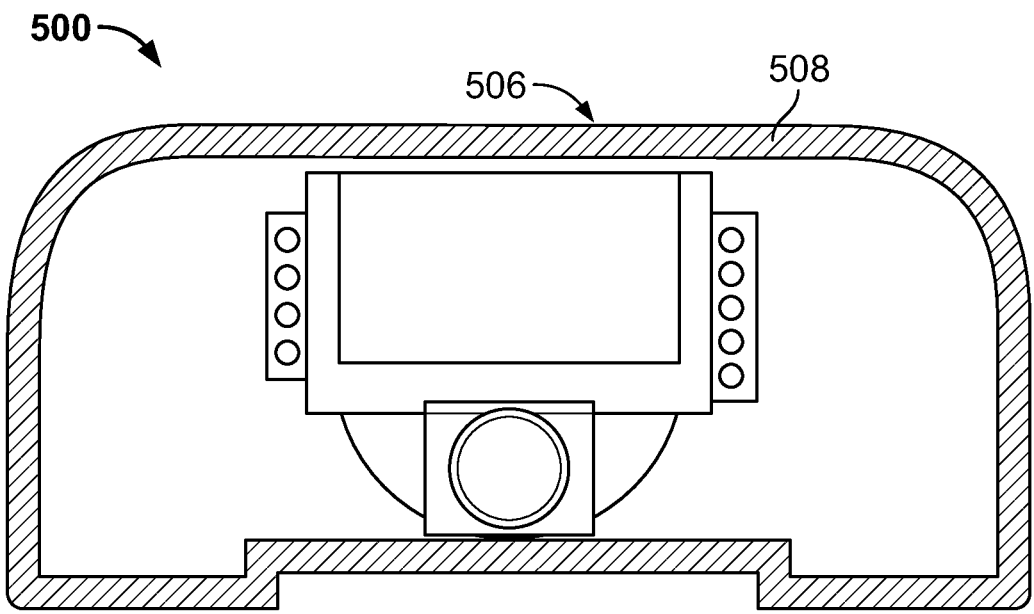
FIG. 16 is a rear view of the remote sensor unit of FIG. 13 with a rear cover removed, according to an exemplary embodiment.
Figure 17:
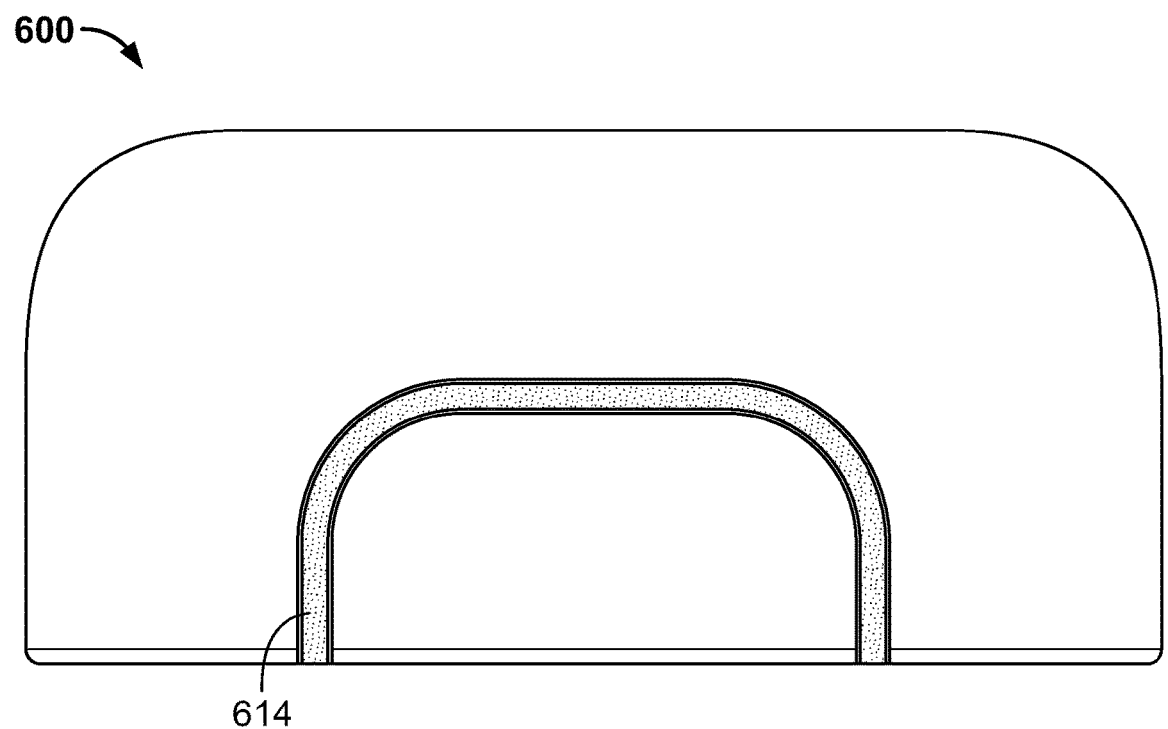
FIG. 17 is a front view of a remote sensor unit for a thermostat, according to an exemplary embodiment.
Figure 18:
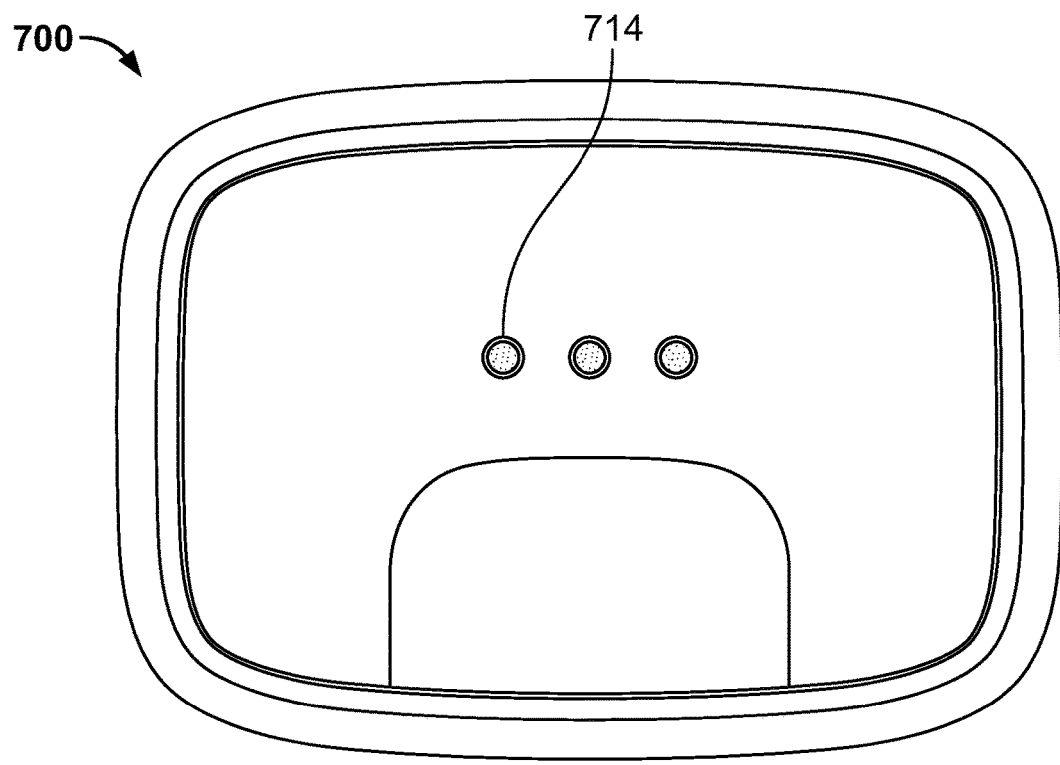
FIG. 18 is a front view of a remote sensor unit for a thermostat, according to an exemplary embodiment.
Figure 19:
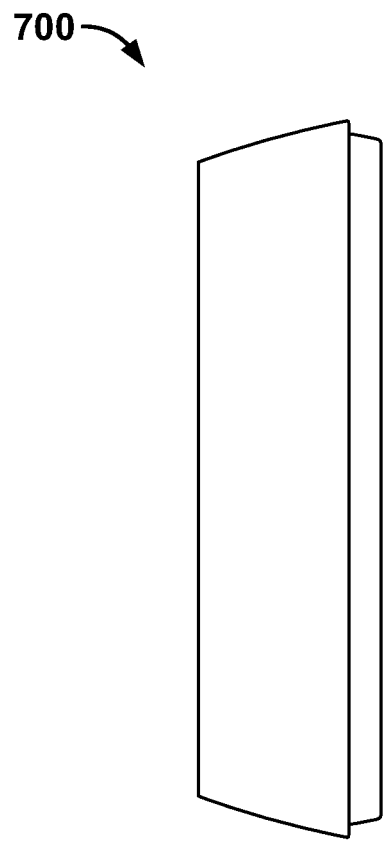
FIG. 19 is a side view of the remote sensor unit of FIG. 18, according to an exemplary embodiment.

FIGS. 13-16 show another exemplary embodiment of a sensor unit 500. As in other embodiments described herein, the sensor unit 500 includes a housing 506 including a base 508, a face plate 510, a sensor window 512, and an LED indicator 514. As shown in FIG. 14, the sensor unit 500 additionally includes a retractable support, shown as support 520, which is hingedly coupled to the base 508. The sensor unit 500 is reconfigurable between a wall mounted configuration and a standalone configuration depending on the position of the support 320. The support 320 is retracted by rotating it upwards and toward the base 508 (e.g., in a counterclockwise direction 509 as shown in FIG. 14). FIGS. 15-16 show the arrangement of electrical components within an internal cavity 511 of the base 508. Again, the electrical components may be arranged to at least partially surround an occupancy sensor 513. Alternatively, a thickness of the base 508 may be sufficient to place one or more electrical components (e.g., batteries) in-line with the occupancy sensor (and/or other electrical components for the sensor unit 500). FIG. 17 shows an alternative embodiment of a sensor unit 600, similar to the sensor unit 500 of FIGS. 13-15. The sensor unit 600 of FIG. 17 includes an LED indicator 614 that "wraps" around the sensor window 512 of the sensor unit 600.

Figure 20:
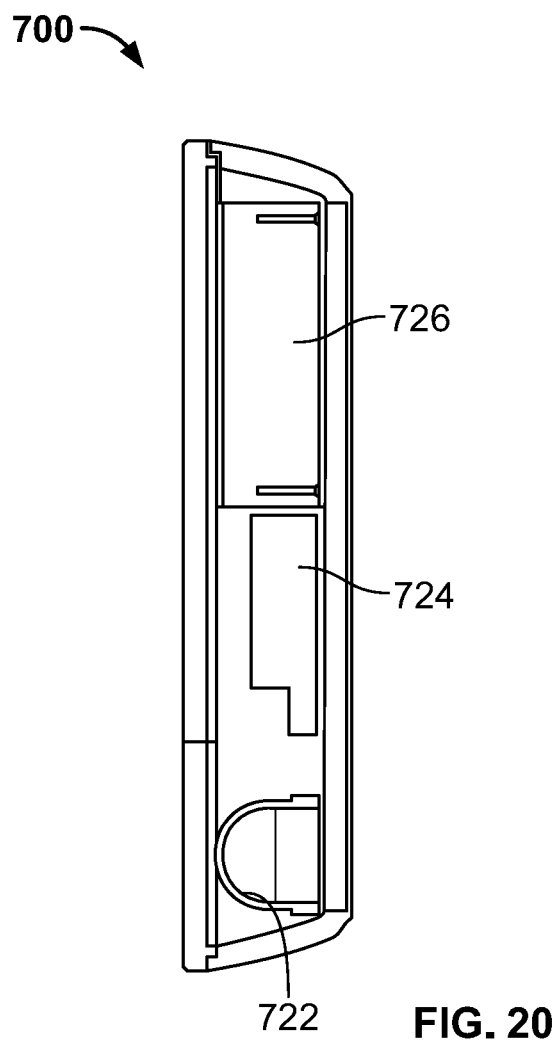
FIG. 20 is a side sectional view of the remote sensor unit of FIG. 18, according to an exemplary embodiment.
Figure 21:
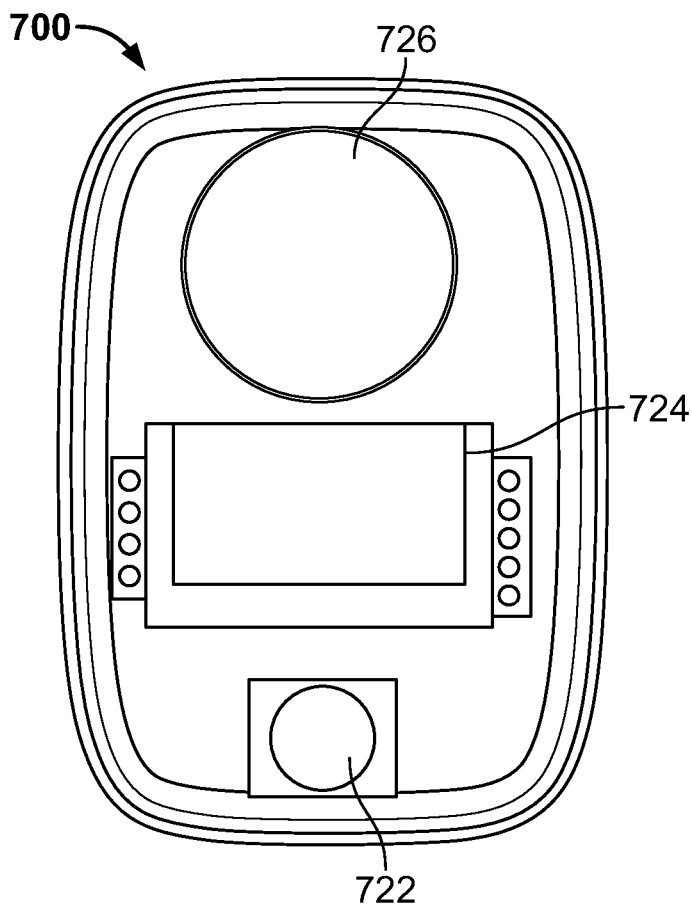
FIG. 21 is a rear view of the remote sensor unit of FIG. 18, according to an exemplary embodiment.
Figure 22:
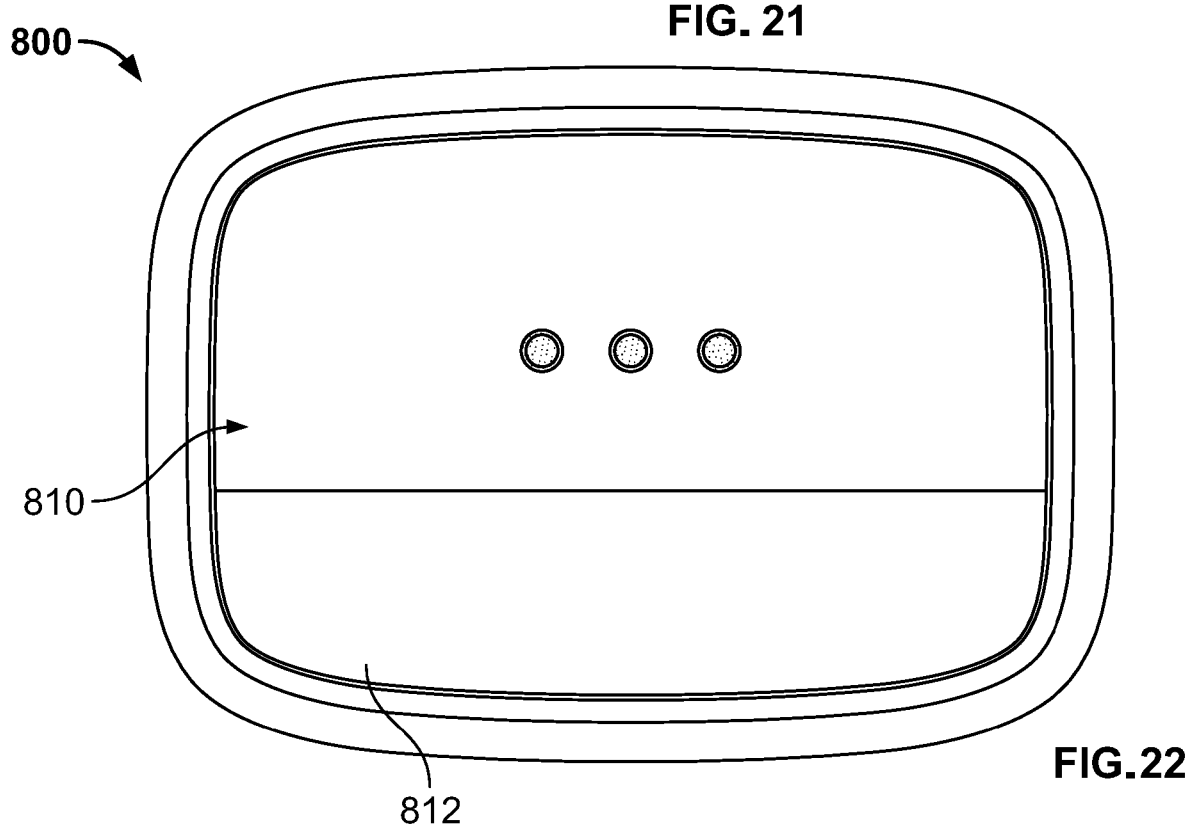
FIG. 22 is a front view of a remote sensor unit for a thermostat, according to an exemplary embodiment.
Figure 23:
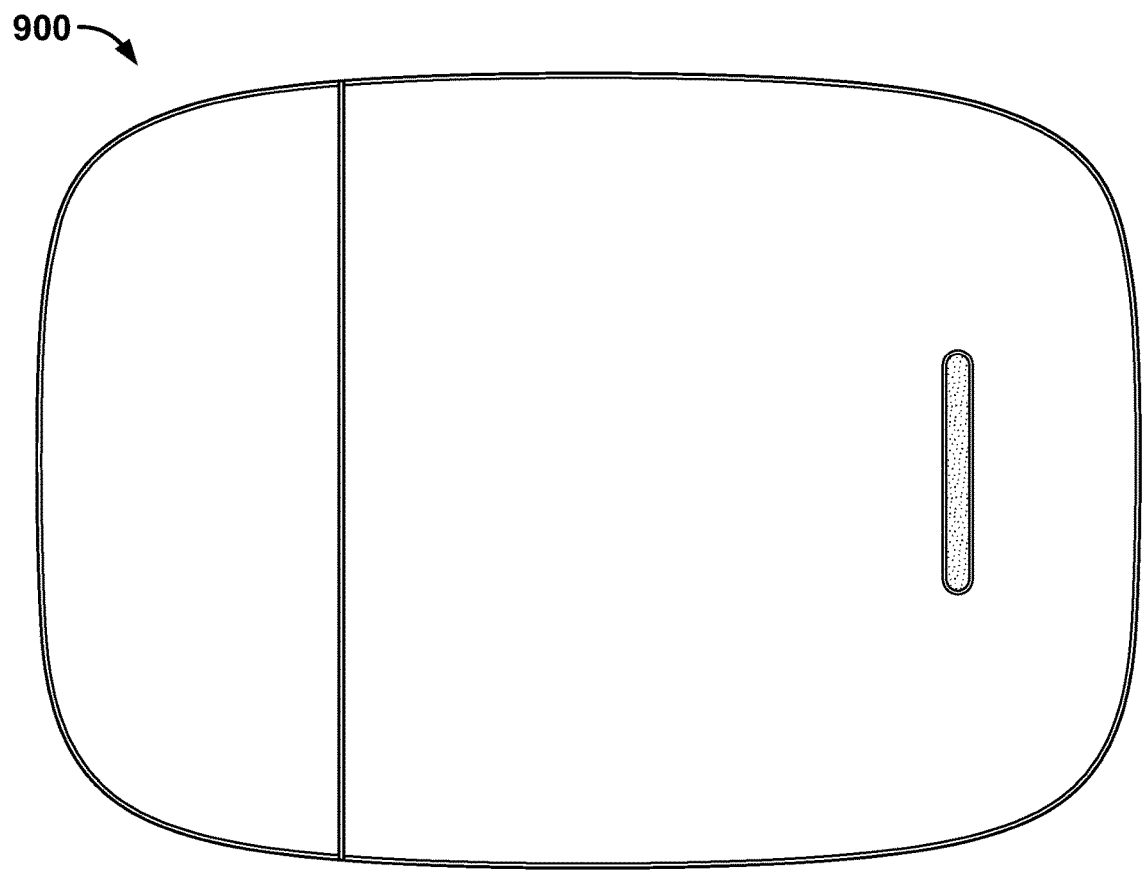
FIG. 23 is a front view of a remote sensor unit for a thermostat, according to an exemplary embodiment.
Figure 24:
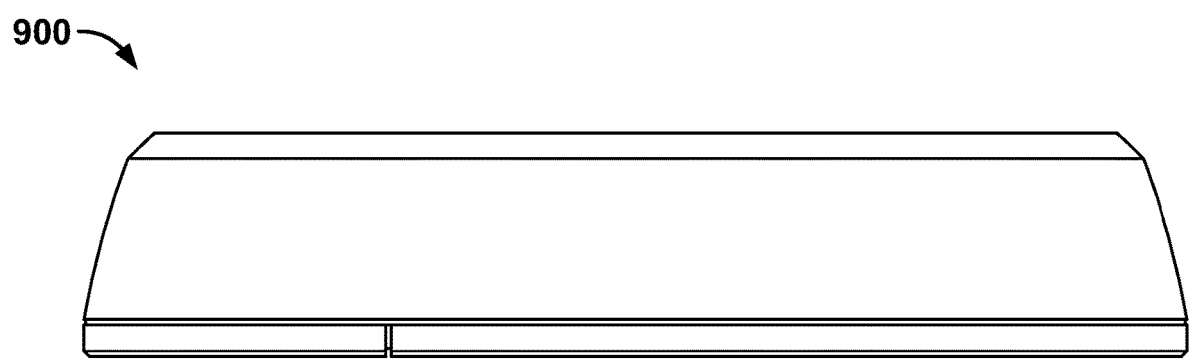
FIG. 24 is a top view of the remote sensor unit of FIG. 23, according to an exemplary embodiment.
Figure 25:
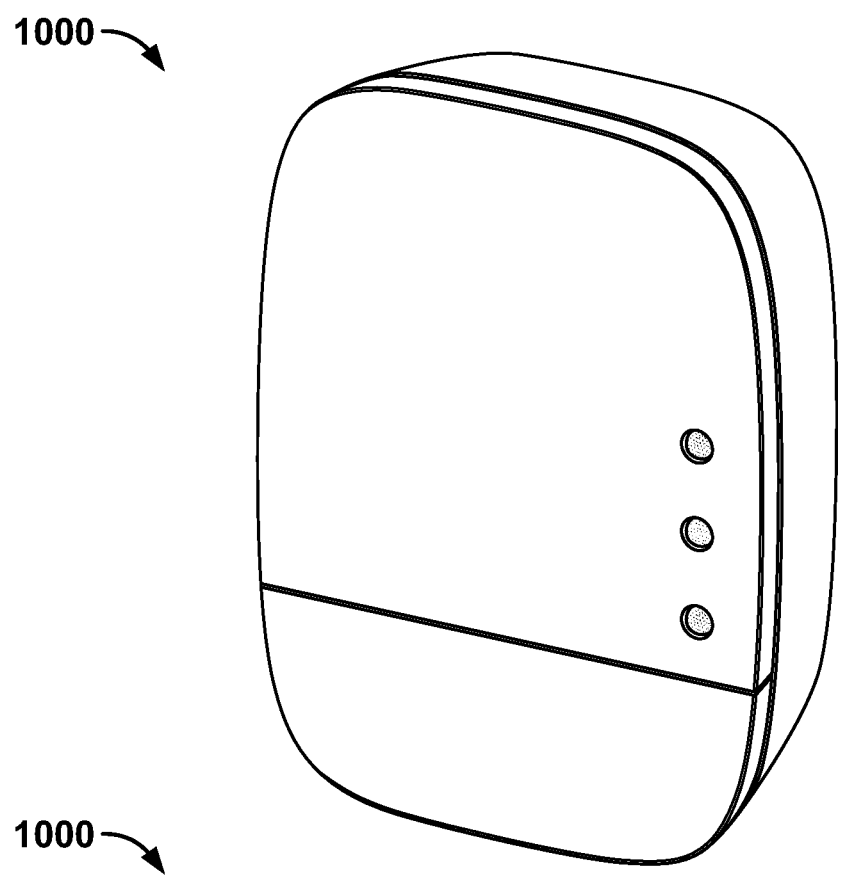
FIG. 25 is a perspective view of a remote sensor unit for a thermostat, according to an exemplary embodiment.
Figure 26:
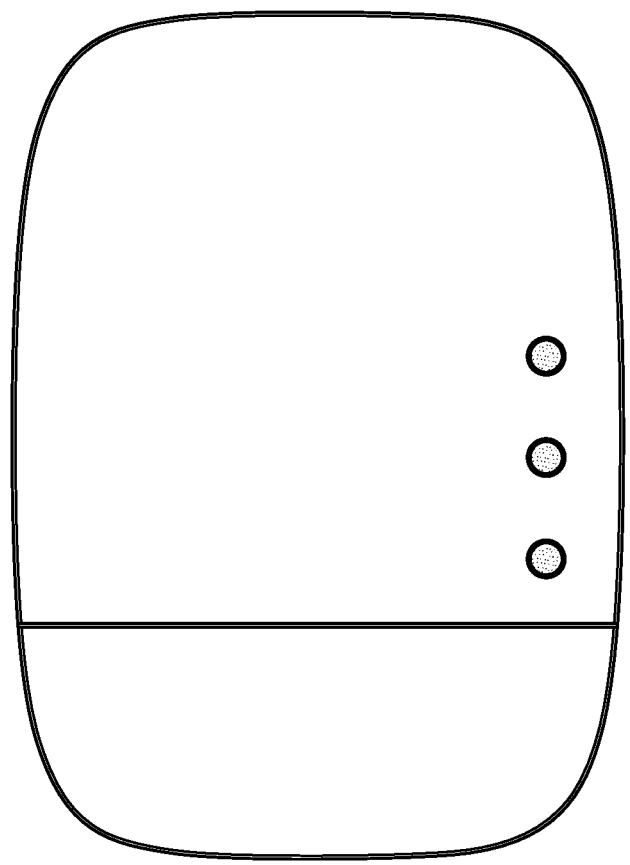
FIG. 26 is a front view of the remote sensor unit of FIG. 25, according to an exemplary embodiment.
Figure 27:
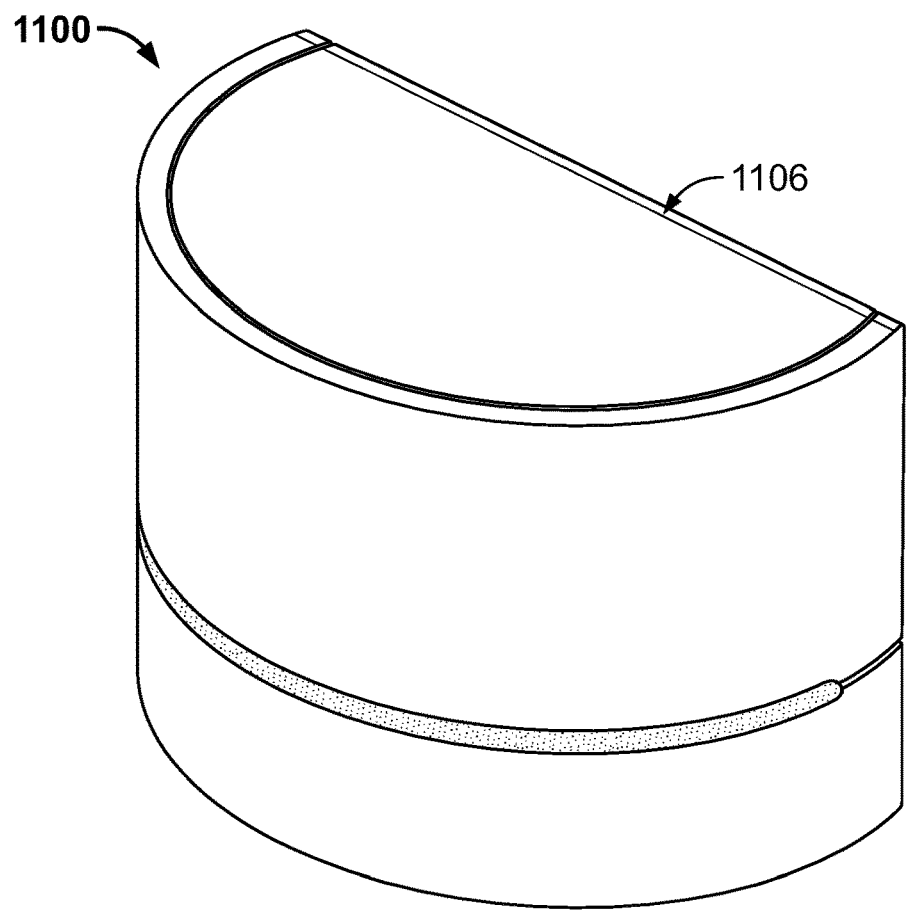
FIG. 27 is a perspective view of a remote sensor unit for a thermostat, according to an exemplary embodiment.
Figure 28:
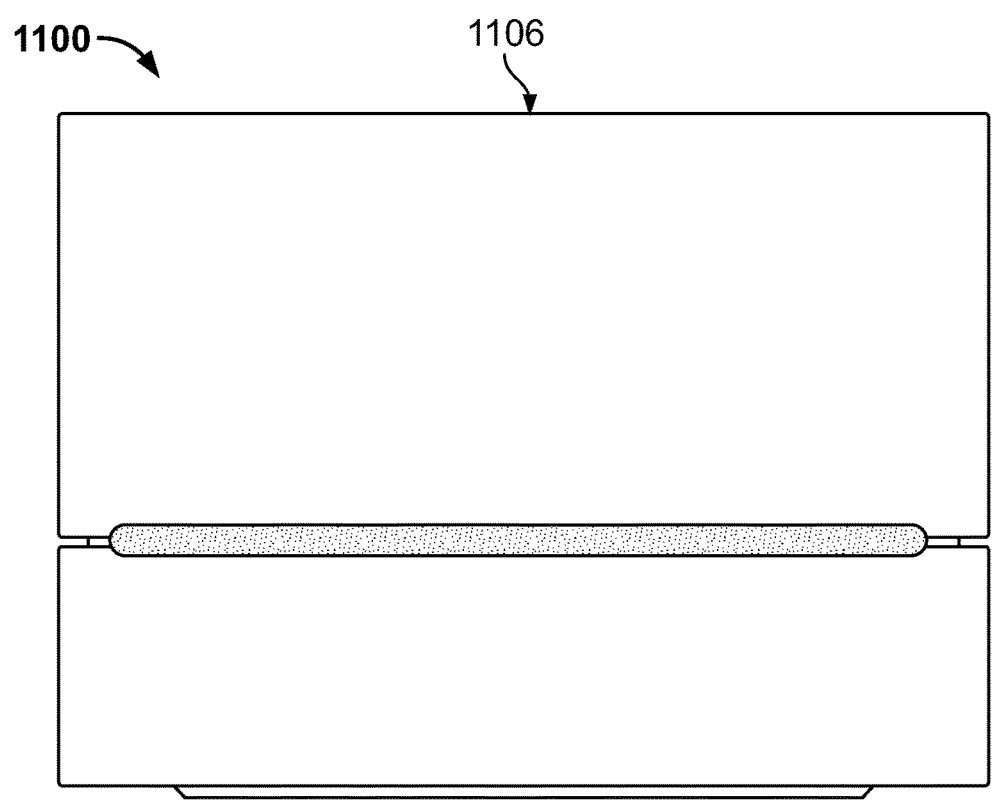
FIG. 28 is a front view of the remote sensor unit of FIG. 27, according to an exemplary embodiment.
Figure 29:
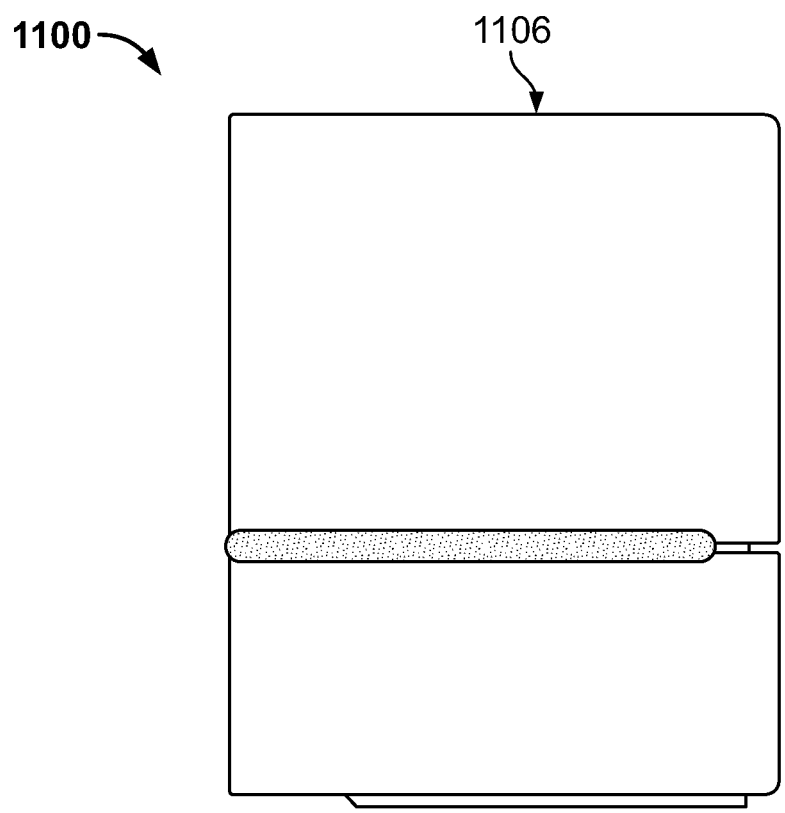
FIG. 29 is a side view of the remote sensor unit of FIG. 27, according to an exemplary embodiment.
Figure 30:
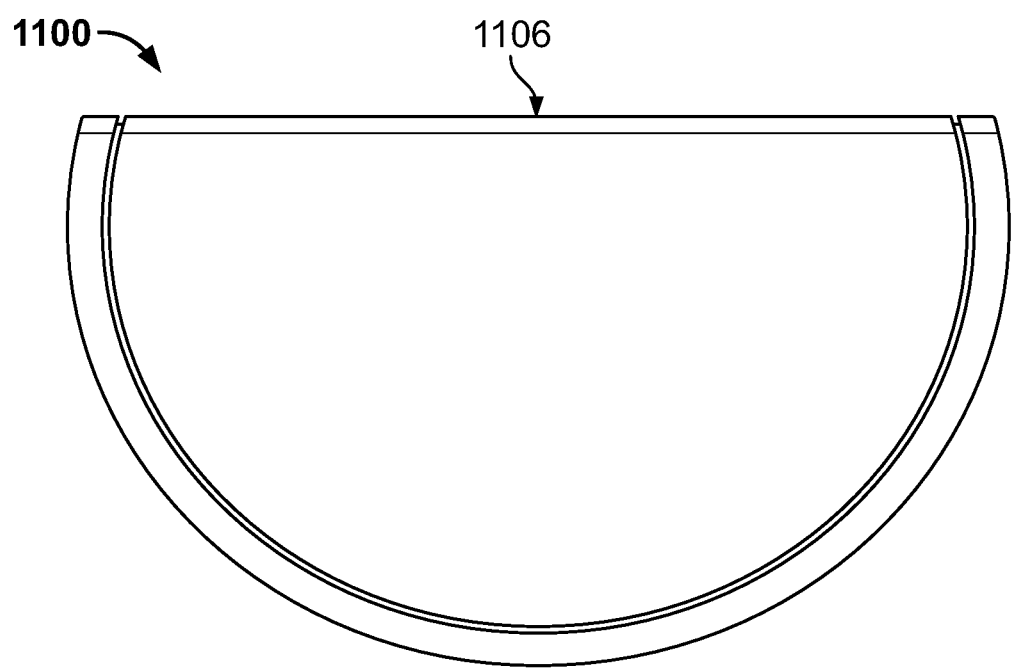
FIG. 30 is a top view of the remote sensor unit of FIG. 27, according to an exemplary embodiment.
Figure 31:
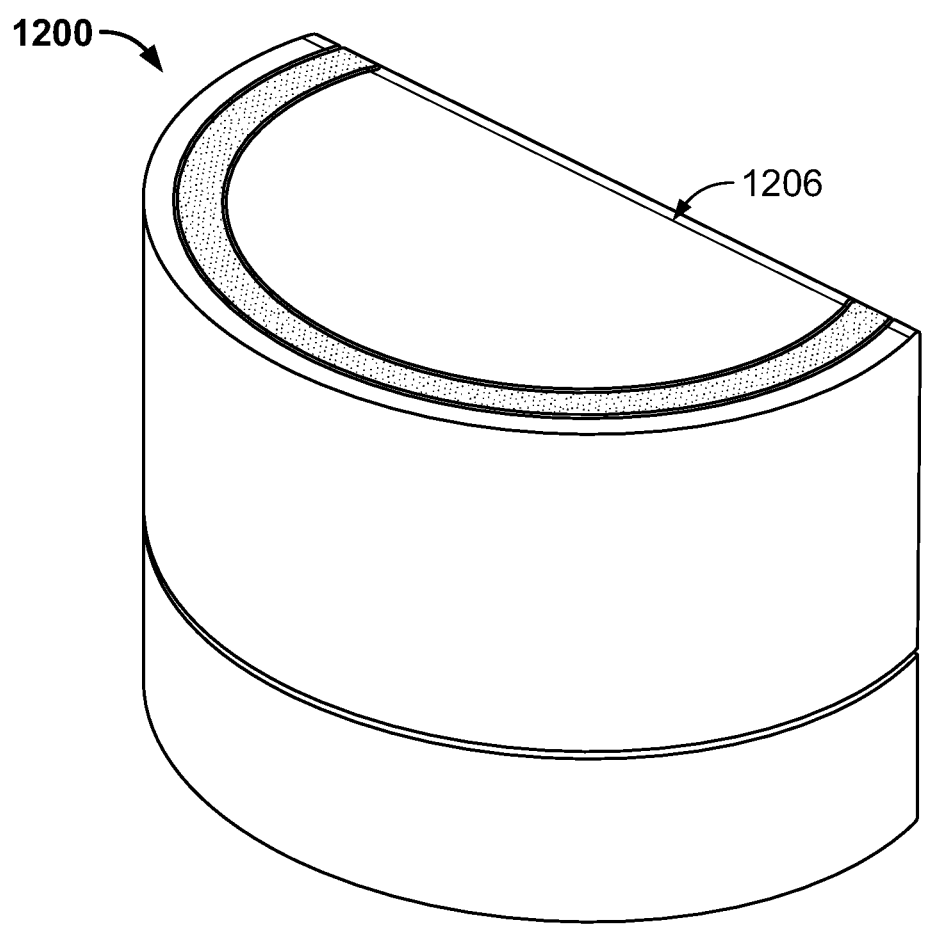
FIG. 31 is a perspective view of a remote sensor unit for a thermostat, according to an exemplary embodiment.
Figure 32:
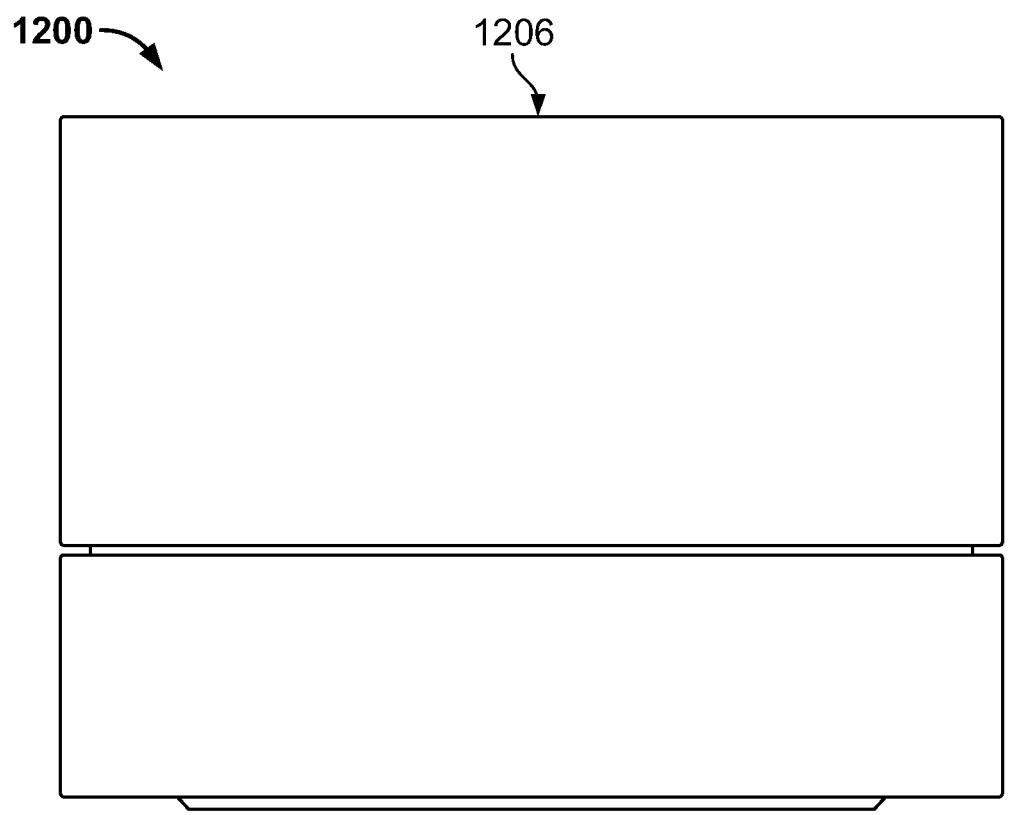
FIG. 32 is a front view of the remote sensor unit of FIG. 31, according to an exemplary embodiment.
Figure 33:
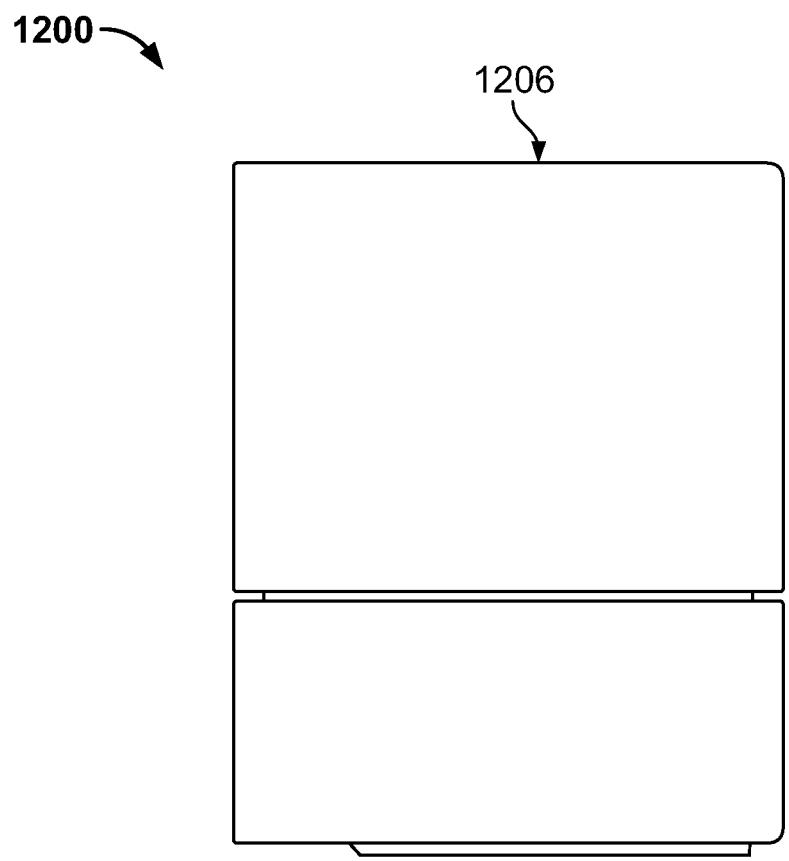
FIG. 33 is a side view of the remote sensor unit of FIG. 31, according to an exemplary embodiment.
Figure 34:
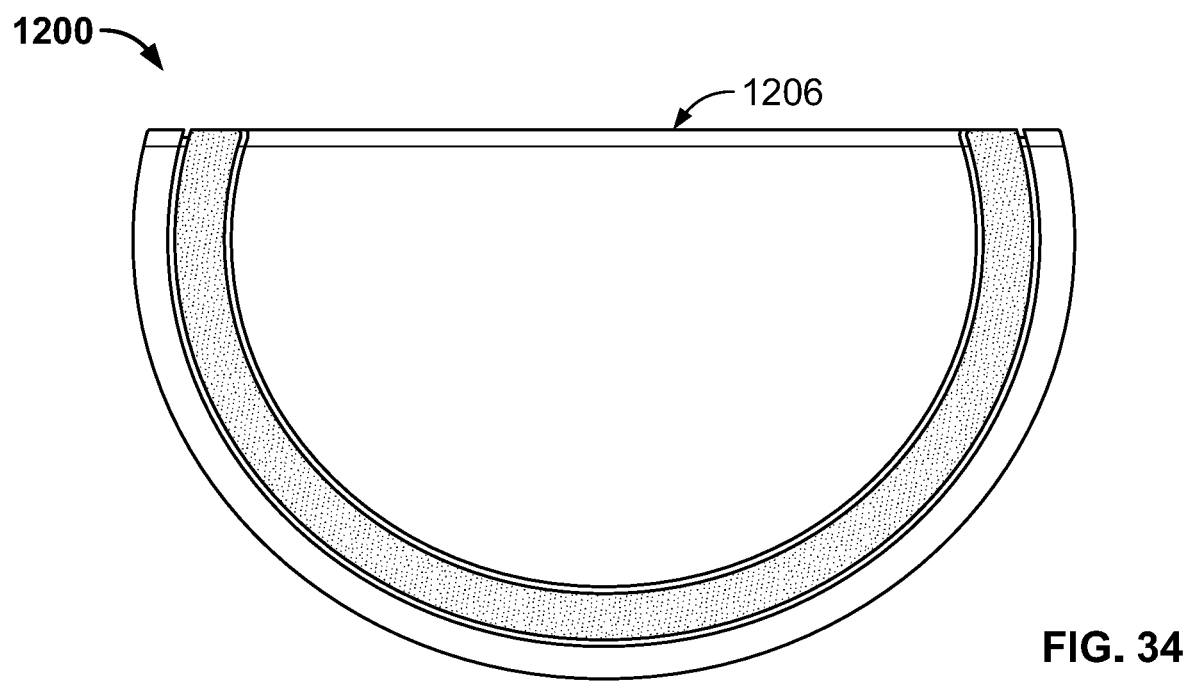
FIG. 34 is a top view of the remote sensor unit of FIG. 31, according to an exemplary embodiment.
Figure 35:
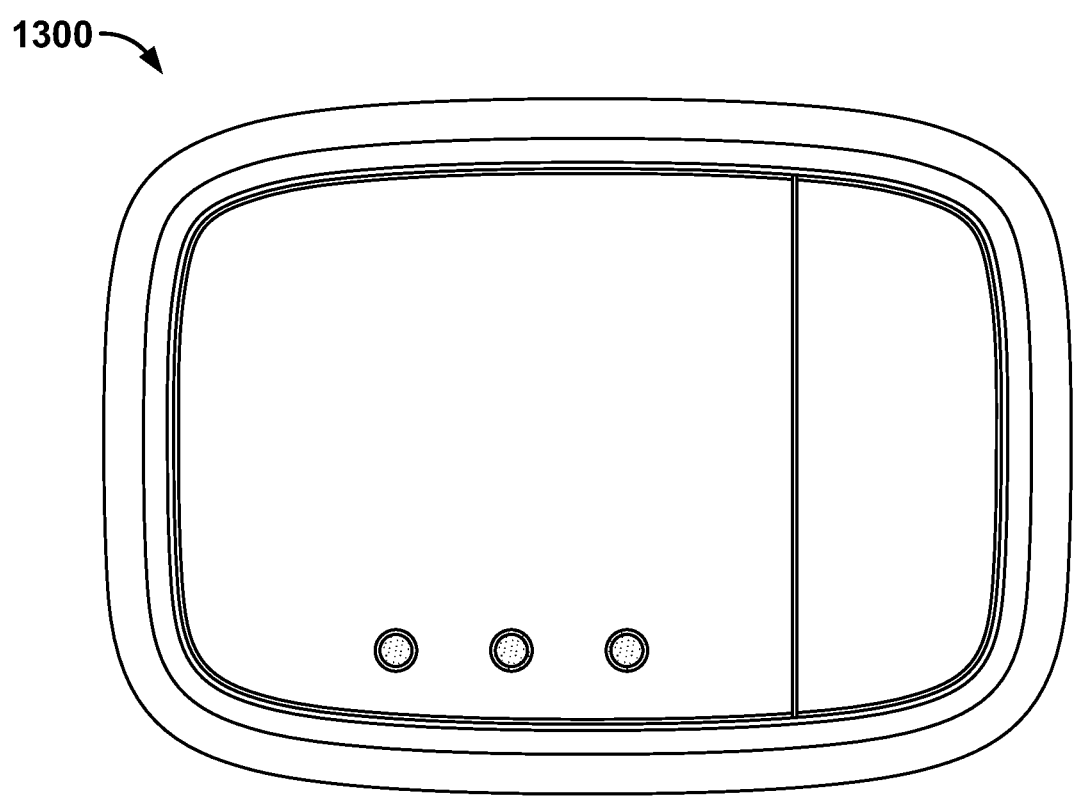
FIG. 35 is a top view of a remote sensor unit for a thermostat, according to an exemplary embodiment.

Yet another exemplary embodiment of a sensor unit 700 is shown in FIGS. 18-21. The sensor unit 700 includes an LED indicator 714 including three individual LEDs arranged horizontally and spaced in substantially equal intervals across a central portion of the sensor unit 700. The LEDs may be configured to operate in concert (e.g., to animate the display of an operational status of one or a combination of the thermostat 104, sensor units 700, and/or HVAC and non-HVAC equipment) or to operate individually. For example, each of the LEDs could be configured to display an operational status for a different component (e.g., one LED reporting an operational status of the sensor unit 700, one LED reporting an operational status for HVAC equipment, etc.). As shown in FIGS. 20-21, electrical components for the sensor unit 700, including a battery 726, a PCB 724, and an occupancy sensor 722, may be arranged in-line in a substantially vertical direction (as shown in FIG. 21) along a length of the sensor unit 700. FIG. 22 shows an alternative embodiment of the sensor unit 700 of FIGS. 18-21, shown as sensor unit 800, which includes a sensor window 812 that extends along an entire lower edge of the face plate 810.

Various additional embodiments of sensor units 900, 1000, 1100, 1300, 1400 in accordance with the present disclosure are shown in FIGS. 23-35. Although functionally similar, an arrangement of a housing and an LED indicator for each of the sensor units 900, 1000, 1100, 1300, 1400 is different. For example, as shown for the sensor units 1100 and 1200 of FIGS. 27-34, a housing 1106, 1206 for the sensor units 1100, 1200 is entirely self-supporting (e.g., a retractable stand or support is not required to ensure the stability of the device). The sensor units 1100, 1200 of FIGS. 27-34 additionally include a rubber bumper configured to interface with a flat horizontal surface and to prevent the sensor unit 1100, 1200 from moving relative to the surface.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building control system, comprising:
   a main control unit configured to operate a controlled device to affect one or more environmental conditions of a first space of a building;
   a sensor unit communicably coupled to the main control unit and configured to be disposed in the first space, the sensor unit comprising one or more sensors, the sensor unit configured to determine an environmental condition of the first space based on sensor data from the sensor and configured to provide at least some of the sensor data to the main control unit; and the controlled device being communicably coupled to the sensor unit and the main control unit and operable to affect the environmental condition of the first space, the sensor unit configured to control the controlled device independently from the main control unit, and the main control unit configured to control the controlled device independently from the sensor unit.

2. The building control system of claim 1, wherein the sensor unit is one of a plurality of sensor units, wherein the building control system further comprises a user control device, wherein the user control device is configured to access a web portal from which the plurality of sensor units may be identified, mapped to the first space, and paired with the main control unit and the controlled device, and wherein the plurality of sensor units may be mapped to the first space at the same time.

3. The building control system of claim 1, wherein the environmental condition is at least one of a temperature of the first space, a humidity of the first space, an air quality of the first space, or an amount of lighting within the first space.

4. The building control system of claim 1, wherein the sensor is an air quality sensor, wherein the sensor unit is configured to control the controlled device based on a determination that air quality data from the air quality sensor is greater than or less than an air quality threshold.

5. The building control system of claim 4, wherein the air quality sensor is one of a CO2 sensor configured to measure an amount of CO2 in the first space, a VOC sensor configured to measure an amount of VOC in the first space, or a Radon sensor configured to measure an amount of Radon within the first space.

6. The building control system of claim 1, wherein the controlled device is one of an air conditioning unit, a heater, a light, an automatic window blind, a fan, or a smart vent.

7. The building control system of claim 1, wherein the building further comprising a second space that is located at least partially remotely from the first space, and wherein the controlled device is configured to selectively modify the environmental condition of the first space independently from an environmental condition of the second space.

8. The building control system of claim 1, wherein the building further comprising a second space that is located at least partially remotely from the first space, wherein the sensor unit is configured to transmit at least one of the sensor data or the environmental condition to the main control unit, and wherein the main control unit is configured to control the controlled device to modify the environmental condition of the first space independently from the second space based on the sensor data or the environmental condition.

9. The building control system of claim 1, wherein the sensor unit is a first sensor unit of a plurality of sensor units, further comprising a second sensor unit, wherein the first sensor unit is configured to control the controlled device based on at least one of sensor data from the second sensor unit or an environmental condition from the second sensor unit.

10. A sensor unit, comprising:

a housing configured to be disposed in a first space of a building;

a sensor coupled to the housing and configured to generate sensor data that is indicative of an environmental condition of the first space;

a communications interface coupled to the housing and configured to communicate with a main control unit and a controlled device; and a processing circuit coupled to the housing and configured to:

receive identifying information associated with the main control unit and the controlled device;

receive the sensor data from the sensor;

identify the environmental condition of the first space based on the sensor data; and transmit, by the communications interface, a control signal to the controlled device independently from the main control unit based on the environmental condition.

11. The sensor unit of claim 10, wherein the communications interface is configured to communicate with a user control device, and wherein the processing circuit is further configured to:

transmit identification information associated with the sensor unit to the user control device;

and pair with the main control unit and the controlled device such that the sensor unit is communicably coupled to the main control unit and the controlled device.

12. The sensor unit of claim 10, wherein the environmental condition is at least one of a temperature of the first space, a humidity of the first space, an air quality of the first space, or an amount of lighting within the first space.

13. The sensor unit of claim 10, wherein the sensor is an air quality sensor, wherein the processing circuit is configured to transmit the control signal to the controlled device based on a determination that air quality data from the air quality sensor is greater than or less than an air quality threshold.

14. The sensor unit of claim 10, wherein the controlled device is one of an air conditioning unit, a heater, a light, an automatic window blind, a fan, or a smart vent.

15. The sensor unit of claim 10, wherein the building further comprising a second space that is located at least partially remotely from the first space, and wherein the controlled device is configured to selectively modify the environmental condition of the first space independently from an environmental condition of the second space.

16. The sensor unit of claim 10, wherein the building further comprising a second space that is located at least partially remotely from the first space, wherein the processing circuit is further configured to transmit at least one of the sensor data or the environmental condition to the main control unit, and wherein the main control unit is configured to control the controlled device to modify the environmental condition of the first space independently from an environmental condition of the second space based on the sensor data or the environmental condition.

17. A method, comprising:

receiving, by a sensor unit, sensor data from a sensor onboard the sensor unit, the sensor unit communicably coupled to a main control unit and a controlled device, the main control unit configured to operate one or more controlled devices to affect one or more environmental conditions of a first space of a building;

receiving identifying information associated with the main control unit and the controlled device;

identifying, by the sensor unit, an environmental condition of the first space based on the sensor data;

transmitting, by a communications interface onboard the sensor unit, a control signal to the controlled device independently from the main control unit based on the environmental condition.

18. The method of claim 17, further comprising:
transmitting, by the communications interface, identification information associated with the sensor unit; and
pairing with the main control unit and the controlled device such that the sensor unit is communicably coupled to the main control unit and the controlled device.

19. The method of claim 17, wherein the environmental condition is at least one of a temperature of the first space, a humidity of the first space, an air quality of the first space, or an amount of lighting within the first space.

20. The method of claim 17, wherein receiving sensor data comprises receiving air quality data from an air quality sensor, and wherein the control signal is transmitted to the controlled device based on a determination that the air quality data is greater than or less than an air quality threshold.

21. The building control system of claim 1, wherein the controlled device is HVAC equipment that is remote from the first space.

* * * * *